US008813085B2

(12) United States Patent
Glew et al.

(10) Patent No.: US 8,813,085 B2
(45) Date of Patent: Aug. 19, 2014

(54) SCHEDULING THREADS BASED ON PRIORITY UTILIZING ENTITLEMENT VECTORS, WEIGHT AND USAGE LEVEL

(75) Inventors: Andrew F. Glew, Hillsboro, OR (US); Daniel A. Gerrity, Seattle, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 141 days.

(21) Appl. No.: 13/317,826

(22) Filed: Oct. 28, 2011
(Under 37 CFR 1.47)

(65) Prior Publication Data
US 2013/0111489 A1 May 2, 2013

Related U.S. Application Data

(63) Continuation-in-part of application No. 13/136,024, filed on Jul. 19, 2011, and a continuation-in-part of application No. 13/317,825, filed on Oct. 28, 2011, and a continuation-in-part of application No. 13/317,834, filed on Oct. 28, 2011, and a continuation-in-part of application No. 13/200,556, filed on Sep. 24, 2011, and a continuation-in-part of application No. 13/200,557, filed on Sep. 24, 2011, and a continuation-in-part of application No. 13/200,547, filed on Sep. 24, 2011, and a continuation-in-part of application No. 13/136,400, filed on Jul. 29, 2011, and a continuation-in-part of application No. 13/136,401, filed on Jul. 29, 2011, and a continuation-in-part of application No. 13/199,368, filed on Aug. 26, 2011, and a continuation-in-part of application No. 13/136,670, filed on Aug. 4, 2011, and a continuation-in-part of application No. 13/136,666, filed on Aug. 4, 2011.

(60) Provisional application No. 61/632,836, filed on Sep. 24, 2011.

(51) Int. Cl.
G06F 9/46 (2006.01)
G06F 9/455 (2006.01)

(52) U.S. Cl.
USPC .......................................... 718/103; 718/104

(58) Field of Classification Search
CPC ....... G06F 9/4843; G06F 9/4881; G06F 9/50; G06F 9/505
See application file for complete search history.

(56) References Cited

U.S. PATENT DOCUMENTS 4,525,599 A 6/1985 Curran et al.
5,437,032 A * 7/1995 Wolf et al. .................... 718/103

(Continued)

FOREIGN PATENT DOCUMENTS

WO WO 01/99075 A2 12/2001

OTHER PUBLICATIONS

Adya et al.; "FARSITE: Federated, Available, and Reliable Storage for an Incompletely Trusted Enviroment"; 5th Symposium on Operating Systems Design and Implementation; bearing a date of Dec. 2002; pp. 1-14; Boston, MA.

(Continued)

Primary Examiner — Meng An
Assistant Examiner — Bradley Teets

(57) ABSTRACT

An embodiment or embodiments of an information handling apparatus can use an entitlement vector to simultaneously manage and activate entitlement of objects and processes to various resources independently from one another. An information handling apparatus can comprise an entitlement vector operable to specify resources used by at least one object of a plurality of object. The information handling apparatus can further comprise a scheduler operable to schedule a plurality of threads based at least partly on entitlement as specified by the entitlement vector.

24 Claims, 20 Drawing Sheets

(56) References Cited

U.S. PATENT DOCUMENTS

| | | | |
|---|---|---|---|
| 5,623,637 A | 4/1997 | Jones et al. | |
| 6,006,328 A | 12/1999 | Drake | |
| 6,057,598 A | 5/2000 | Payne et al. | |
| 6,154,741 A * | 11/2000 | Feldman | 1/1 |
| 6,654,745 B2 | 11/2003 | Feldman | |
| 6,996,547 B1 | 2/2006 | Tugenberg et al. | |
| 7,054,190 B2 | 5/2006 | Hanyu et al. | |
| 7,107,176 B2 | 9/2006 | Henry et al. | |
| 7,124,170 B1 | 10/2006 | Sibert | |
| 7,165,150 B2 | 1/2007 | Alverson et al. | |
| 7,221,600 B2 | 5/2007 | Hara et al. | |
| 7,379,999 B1 | 5/2008 | Zhou et al. | |
| 7,395,414 B2 * | 7/2008 | Le et al. | 712/216 |
| 7,502,946 B2 | 3/2009 | Perkins et al. | |
| 7,533,273 B2 | 5/2009 | Patariu et al. | |
| 7,549,054 B2 * | 6/2009 | Brodie et al. | 713/182 |
| 7,594,111 B2 | 9/2009 | Kiriansky et al. | |
| 7,620,941 B1 | 11/2009 | Leventhal | |
| 7,644,162 B1 | 1/2010 | Zhu et al. | |
| 7,676,578 B1 | 3/2010 | Zhu et al. | |
| 7,757,282 B2 | 7/2010 | Pandit et al. | |
| 7,861,305 B2 | 12/2010 | McIntosh et al. | |
| 7,870,610 B1 | 1/2011 | Mitchell et al. | |
| 7,873,998 B1 | 1/2011 | Wilkinson et al. | |
| 7,877,585 B1 | 1/2011 | Coon et al. | |
| 7,953,986 B2 | 5/2011 | Lee | |
| 7,958,558 B1 | 6/2011 | Leake et al. | |
| 8,022,724 B1 | 9/2011 | Jenkins, IV | |
| 8,099,574 B2 | 1/2012 | Savagaonkar et al. | |
| 8,136,158 B1 | 3/2012 | Sehr et al. | |
| 8,146,106 B2 | 3/2012 | Kim et al. | |
| 8,281,388 B1 | 10/2012 | Sobel et al. | |
| 8,286,250 B1 | 10/2012 | Le et al. | |
| 8,312,509 B2 | 11/2012 | Zimmer et al. | |
| 8,381,192 B1 | 2/2013 | Drewry et al. | |
| 8,397,238 B2 | 3/2013 | Venkumahanti et al. | |
| 8,510,827 B1 | 8/2013 | Leake et al. | |
| 8,694,947 B1 | 4/2014 | Venkataramani et al. | |
| 2002/0040420 A1 | 4/2002 | Yamauchi et al. | |
| 2002/0075844 A1 | 6/2002 | Hagen | |
| 2002/0141577 A1 | 10/2002 | Ripley et al. | |
| 2002/0142833 A1 | 10/2002 | Tsuchida et al. | |
| 2002/0152212 A1 | 10/2002 | Feldman | |
| 2002/0156939 A1 | 10/2002 | Armstrong et al. | |
| 2002/0166058 A1 | 11/2002 | Fueki | |
| 2003/0084308 A1 | 5/2003 | Van Rijnswou | |
| 2003/0182436 A1 | 9/2003 | Henry | |
| 2003/0187974 A1 | 10/2003 | Burbeck et al. | |
| 2004/0054925 A1 | 3/2004 | Etheridge et al. | |
| 2004/0116183 A1 | 6/2004 | Prindle | |
| 2004/0117639 A1 | 6/2004 | Mowery | |
| 2004/0117790 A1 * | 6/2004 | Rhine | 718/100 |
| 2004/0199763 A1 | 10/2004 | Freund | |
| 2005/0060710 A1 | 3/2005 | Kush | |
| 2005/0138074 A1 | 6/2005 | O'Connor et al. | |
| 2005/0160428 A1 * | 7/2005 | Ayachitula et al. | 718/104 |
| 2005/0171903 A1 | 8/2005 | Yacobi et al. | |
| 2005/0177596 A1 | 8/2005 | Wu et al. | |
| 2005/0213751 A1 | 9/2005 | Apostolopoulos et al. | |
| 2005/0232415 A1 | 10/2005 | Little et al. | |
| 2005/0268075 A1 | 12/2005 | Caprioli et al. | |
| 2006/0005082 A1 * | 1/2006 | Fossum et al. | 714/42 |
| 2006/0161715 A1 | 7/2006 | Hamaguchi | |
| 2006/0161978 A1 | 7/2006 | Abadi et al. | |
| 2007/0022287 A1 | 1/2007 | Beck et al. | |
| 2007/0079304 A1 | 4/2007 | Zheng et al. | |
| 2007/0101433 A1 | 5/2007 | Louch et al. | |
| 2007/0240215 A1 | 10/2007 | Flores et al. | |
| 2007/0250837 A1 * | 10/2007 | Herington et al. | 718/105 |
| 2008/0028467 A1 | 1/2008 | Kommareddy et al. | |
| 2008/0052541 A1 | 2/2008 | Ginter et al. | |
| 2008/0114990 A1 | 5/2008 | Hilbert et al. | |
| 2008/0168279 A1 | 7/2008 | Kanai | |
| 2008/0250216 A1 | 10/2008 | Kershaw et al. | |
| 2008/0256346 A1 | 10/2008 | Lee et al. | |
| 2008/0263663 A1 | 10/2008 | Ide et al. | |
| 2008/0276317 A1 | 11/2008 | Chandola et al. | |
| 2008/0279371 A1 | 11/2008 | Lee et al. | |
| 2008/0301467 A1 | 12/2008 | Saito | |
| 2008/0313482 A1 | 12/2008 | Karlapalem et al. | |
| 2008/0320565 A1 | 12/2008 | Buch et al. | |
| 2009/0006755 A1 * | 1/2009 | Illikkal et al. | 711/126 |
| 2009/0007125 A1 * | 1/2009 | Barsness et al. | 718/104 |
| 2009/0028135 A1 | 1/2009 | Mantripragada et al. | |
| 2009/0063824 A1 | 3/2009 | Leaback et al. | |
| 2009/0106563 A1 | 4/2009 | Cherpantier | |
| 2009/0144557 A1 | 6/2009 | Sutton | |
| 2009/0172686 A1 | 7/2009 | Chen et al. | |
| 2009/0183263 A1 | 7/2009 | McMichael et al. | |
| 2009/0187771 A1 | 7/2009 | McLellan, Jr. | |
| 2009/0210881 A1 * | 8/2009 | Duller | 718/105 |
| 2009/0265712 A1 * | 10/2009 | Herington | 718/103 |
| 2009/0282474 A1 | 11/2009 | Chen et al. | |
| 2009/0320129 A1 | 12/2009 | Pan et al. | |
| 2009/0320136 A1 | 12/2009 | Lambert et al. | |
| 2010/0191349 A1 | 7/2010 | Munaga | |
| 2010/0281273 A1 | 11/2010 | Lee et al. | |
| 2010/0299305 A1 | 11/2010 | Laxman et al. | |
| 2010/0318998 A1 * | 12/2010 | Golla | 718/104 |
| 2011/0131402 A1 | 6/2011 | Mittal | |
| 2011/0131550 A1 * | 6/2011 | Burckhardt et al. | 717/124 |
| 2011/0131658 A1 | 6/2011 | Bahl | |
| 2011/0138124 A1 | 6/2011 | Hill et al. | |
| 2011/0138473 A1 | 6/2011 | Yee et al. | |
| 2011/0179176 A1 | 7/2011 | Ravichandran et al. | |
| 2011/0202927 A1 * | 8/2011 | Miloushev et al. | 718/104 |
| 2011/0289586 A1 | 11/2011 | Kc et al. | |
| 2011/0307382 A1 | 12/2011 | Siegel et al. | |
| 2012/0079492 A1 * | 3/2012 | Chambliss et al. | 718/104 |
| 2012/0102489 A1 * | 4/2012 | Staiman et al. | 718/1 |
| 2012/0159183 A1 | 6/2012 | Adams et al. | |
| 2012/0179952 A1 | 7/2012 | Tuyls et al. | |
| 2012/0185863 A1 * | 7/2012 | Krstic et al. | 718/104 |
| 2012/0210325 A1 | 8/2012 | de Lind van Wijngaarden et al. | |
| 2012/0221591 A1 | 8/2012 | Yerneni et al. | |
| 2012/0255018 A1 | 10/2012 | Sallam | |
| 2012/0255021 A1 | 10/2012 | Sallam | |
| 2012/0265975 A1 | 10/2012 | Kimelman | |
| 2012/0266243 A1 | 10/2012 | Turkulainen | |
| 2012/0278903 A1 | 11/2012 | Pugh | |
| 2013/0305243 A1 * | 11/2013 | Hiki | 718/1 |

OTHER PUBLICATIONS

Kolbitsch et al.; "Extending Mondrian Memory Protection"; Information Systems and Technology Panel (IST) Symposium, Tallinn, Estonia; bearing a date of Nov. 22-23, 2010; pp. 10-1 through 10-18 and 1 Report Documentation Page; NATO-OTAN.

Bird et al.; "Lighthouse: Hardware Support for Enforcing Information Flow Control on ManyCore Systems"; bearing a date of 2008 (as provided by examiner); 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM.

Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)"; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

Yin et al.; "Panorama: Capturing System-wide Information Flow for Malware Detection and Analysis"; CCS '07; bearing a date of Oct. 29-Nov. 2, 2007; pp. 116-127; ACM.

(56) References Cited

OTHER PUBLICATIONS

Zeldovich et al.; "Hardware Enforcement of Application Security Policies Using Tagged Memory"; bearing a date of 2008 (as provided by examiner), printed Feb. 7, 2013; pp. 1-16; located at: static.usenix.org/events/osdi08/tech/full_papers/zeldovich/zeidovich_html/.

Zhang et al.; "Neon: System Support for Derived Data Management"; VEE '10; bearing a date of Mar. 17-19, 2010; 12 pages; ACM.

Stone, Harold S.; "A Logic-in-Memory Computer"; IEEE Transactions on Computers; bearing a date of Jan. 1970; pp. 73-78.

Abadi et al.; "Control-Flow Integrity: Principles, Implementations, and Applications"; bearing a date of Nov. 1, 2004; pp. 1-33.

Kiriansky et al.; "Secure Execution Via Program Shepherding"; Proceedings of the 11th USENIX Security Symposium; bearing a date of Aug. 2002, created on Dec. 9, 2013; pp. 1-16; San Francisco, CA.

\* cited by examiner

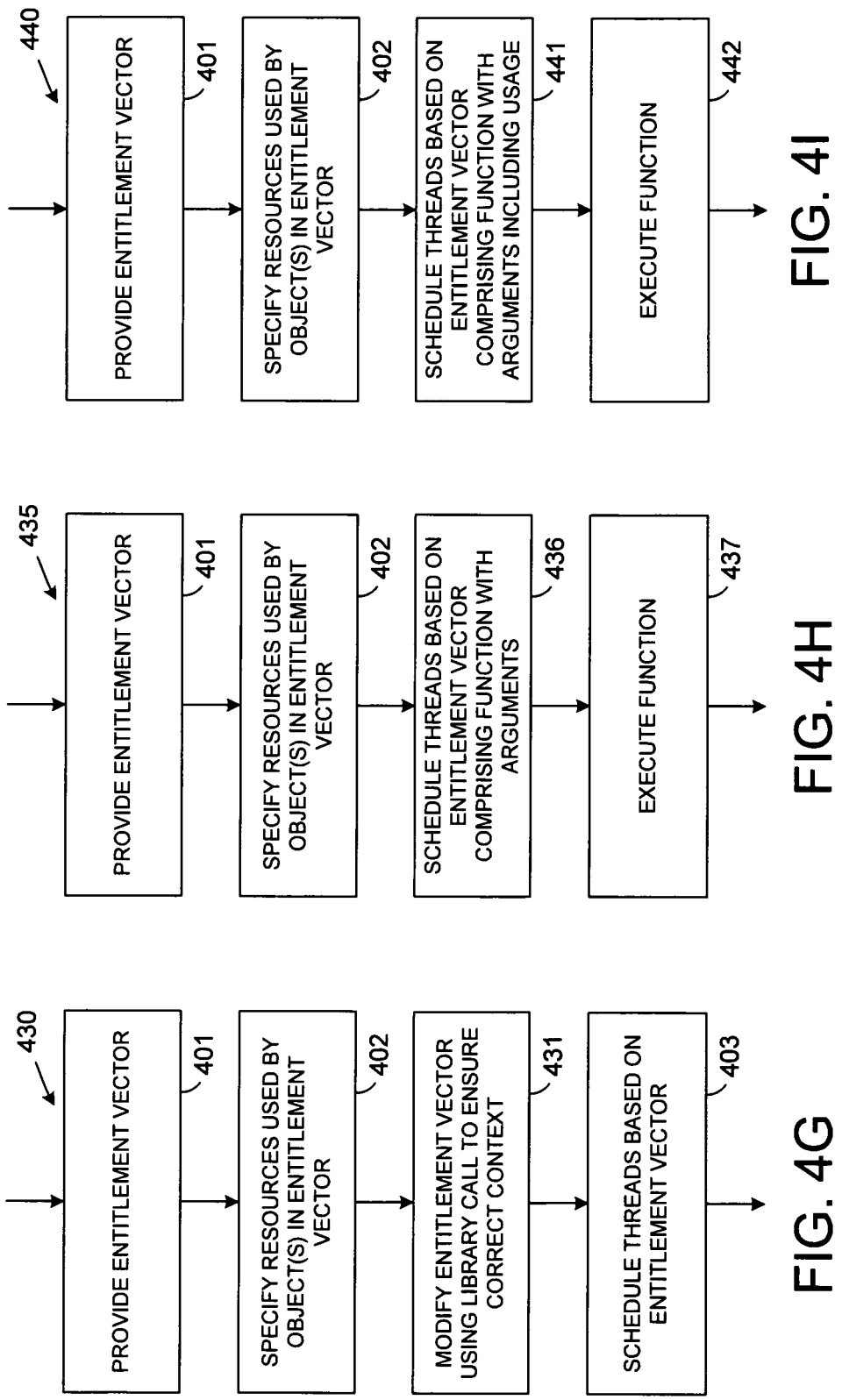

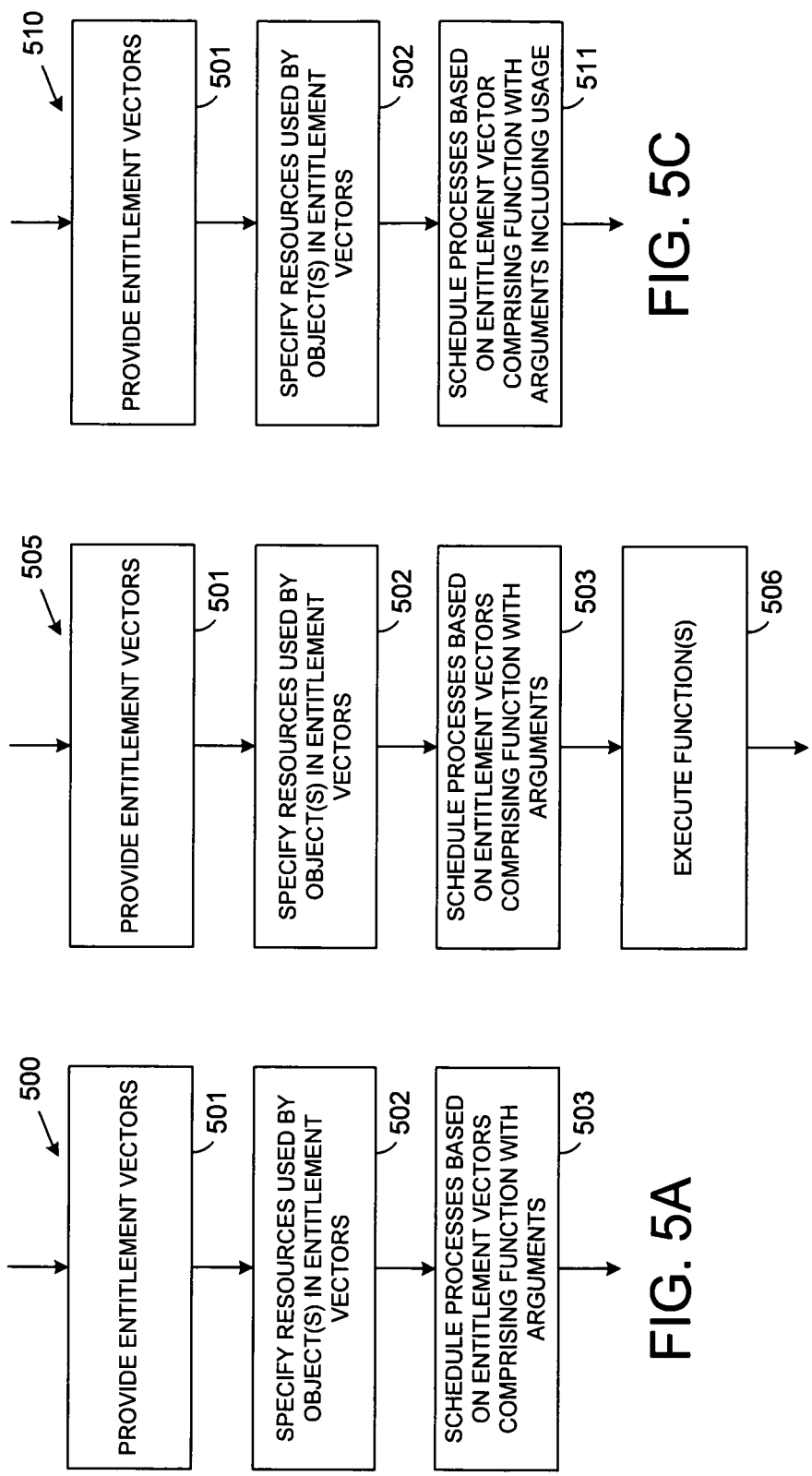

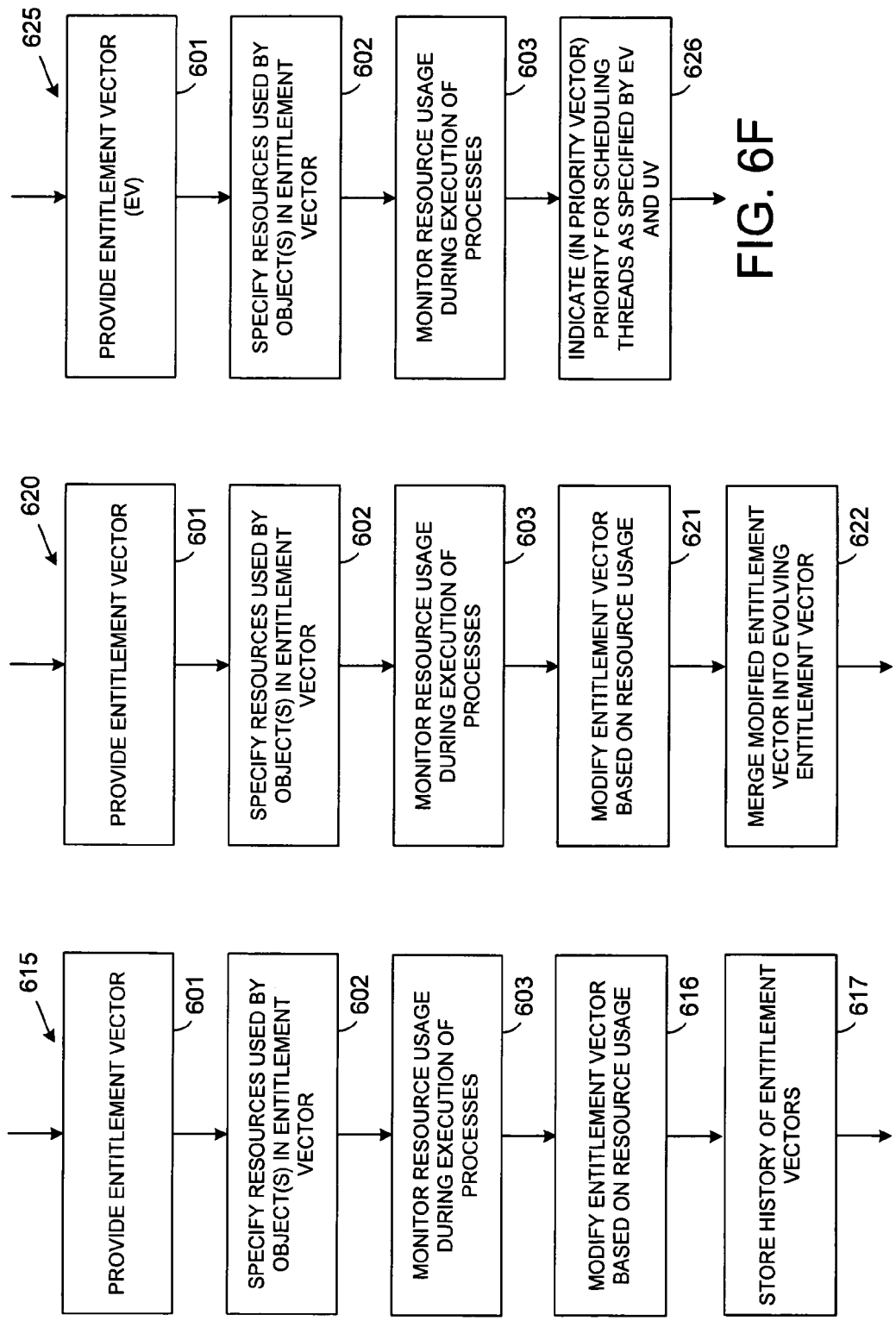

SCHEDULING THREADS BASED ON PRIORITY UTILIZING ENTITLEMENT VECTORS, WEIGHT AND USAGE LEVEL

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the United States Patent and Trademark Office (USPTO) extra-statutory requirements (described more fully below), the present application is:

1. For purposes of the USPTO extra-statutory requirements, the present application constitutes a continuation-in-part of U.S. patent application Ser. No. 13/136,024 entitled CONTROL FLOW INTEGRITY filed on Jul. 19, 2011, and naming Andrew F. Glew, Daniel A. Gerrity, and Clarence T. Tegreene as inventors, which is currently co-pending, or is an application of which a currently co-pending application is entitled to the benefit of the filing date.
2. For purposes of the USPTO extra-statutory requirements, the present application constitutes a continuation-in-part of U.S. patent application Ser. No. 13/136,400 entitled ENCRYPTED MEMORY filed on Jul. 29, 2011, and naming Andrew F. Glew, Daniel A. Gerrity, and Clarence T. Tegreene as inventors, which is currently co-pending, or is an application of which a currently co-pending application is entitled to the benefit of the filing date.
3. For purposes of the USPTO extra-statutory requirements, the present application constitutes a continuation-in-part of U.S. patent application Ser. No. 13/136,401 entitled FINE-GRAINED SECURITY IN FEDERATED DATA SETS filed on Jul. 29, 2011, and naming Andrew F. Glew, Daniel A. Gerrity, and Clarence T. Tegreene as inventors, which is currently co-pending, or is an application of which a currently co-pending application is entitled to the benefit of the filing date.
4. For purposes of the USPTO extra-statutory requirements, the present application constitutes a continuation-in-part of U.S. patent application Ser. No. 13/136,666 entitled SECURITY PERIMETER filed on Aug. 4, 2011, and naming Andrew F. Glew, Daniel A. Gerrity, and Clarence T. Tegreene as inventors, which is currently co-pending, or is an application of which a currently co-pending application is entitled to the benefit of the filing date.
5. For purposes of the USPTO extra-statutory requirements, the present application constitutes a continuation-in-part of U.S. patent application Ser. No. 13/136,670 entitled PROCESSOR OPERABLE TO ENSURE CODE INTEGRITY filed on Aug. 4, 2011, and naming Andrew F. Glew, Daniel A. Gerrity, and Clarence T. Tegreene as inventors, which is currently co-pending, or is an application of which a currently co-pending application is entitled to the benefit of the filing date.
6. For purposes of the USPTO extra-statutory requirements, the present application constitutes a continuation-in-part of U.S. patent application Ser. No. 13/199,368 entitled INTRUSTION DETECTION USING TAINT ACCUMULATION filed on Aug. 26, 2011, and naming Andrew F. Glew, Daniel A. Gerrity, and Clarence T. Tegreene as inventors, which is currently co-pending, or is an application of which a currently co-pending application is entitled to the benefit of the filing date.
7. For purposes of the USPTO extra-statutory requirements, the present application constitutes a continuation-in-part of U.S. patent application Ser. No. 13/200,547 entitled INTRUSTION SET ADAPTED FOR SECURITY RISK MONITORING filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
8. For purposes of the USPTO extra-statutory requirements, the present application constitutes a continuation-in-part of U.S. patent application Ser. No. 13/200,557 entitled RESOURCE ALLOCATION USING ENTITLEMENTS filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
9. For purposes of the USPTO extra-statutory requirements, the present application constitutes a continuation-in-part of U.S. patent application Ser. No. 13/200,550 entitled RESOURCE ALLOCATION USING A LIBRARY WITH ENTITLEMENT filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
10. For purposes of the USPTO extra-statutory requirements, the present application constitutes a continuation-in-part of U.S. patent application Ser. No. 13/200,556 entitled RESOURCE ALLOCATION WITH ENTITLEMENT HINTS filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
11. For purposes of the USPTO extra-statutory requirements, the present application constitutes a continuation-in-part of U.S. patent application Ser. No. 13/317,834 entitled ENTITLEMENT VECTOR WITH RESOURCE AND/OR CAPABILITIES FIELDS filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date.
12. For purposes of the USPTO extra-statutory requirements, the present application constitutes a continuation-in-part of U.S. patent application Ser. No. 13/317,825 entitled TAINT VECTOR LOCATIONS AND GRANULARITY filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date.

The United States Patent and Trademark Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Resource allocation in data processing and computing is used for applications to run on a system. A program initiated by a user generates a process. A computer allocates resources for the process to be run. Typical resources include access to a section of computer memory, data in a device interface buffer, one or more files, a suitable amount of processing power, and the like.

A computer with only a single processor can only perform one process at a time, regardless of the number of programs loaded by a user or initiated on start-up. Single-processor computers emulate the running of multiple programs concurrently because the processor multitasks, rapidly alternating between programs in very small time slices. Time allocation is automatic, however higher or lower priority may be given to certain processes with high priority programs typically allocated either more or larger slices of processor execution time.

On multi-processor computers, different processes can be allocated to different processors so that the computer can truly multitask.

SUMMARY

An embodiment or embodiments of an information handling apparatus can use an entitlement vector to simultaneously manage and activate entitlement of objects and processes to various resources independently from one another. An information handling apparatus can comprise an entitlement vector operable to specify resources used by at least one object of a plurality of object. The information handling apparatus can further comprise a scheduler operable to schedule a plurality of threads based at least partly on entitlement as specified by the entitlement vector.

BRIEF DESCRIPTION OF THE DRAWINGS

Embodiments of the invention relating to both structure and method of operation may best be understood by referring to the following description and accompanying drawings:

FIGS. 2A and 2B are schematic block diagrams illustrating an embodiment or embodiments of an information handling apparatus configured to schedule threads with respect to associated entitlement vectors using various functions of arguments such as entitlement, usage, priority, weighting, and the like;

FIGS. 5A through 5F are schematic flow diagrams showing an embodiment or embodiments of a method operable in an information handling apparatus that uses predetermined functions with arguments indicative of resource usage to facilitate allocation of resources;

FIGS. 6A through 6F are schematic flow diagrams illustrating an embodiment or embodiments of a method operable in an information handling apparatus that employs a usage vector which can determined by logic which monitors resource usage during execution;

DETAILED DESCRIPTION

Figure 1A:
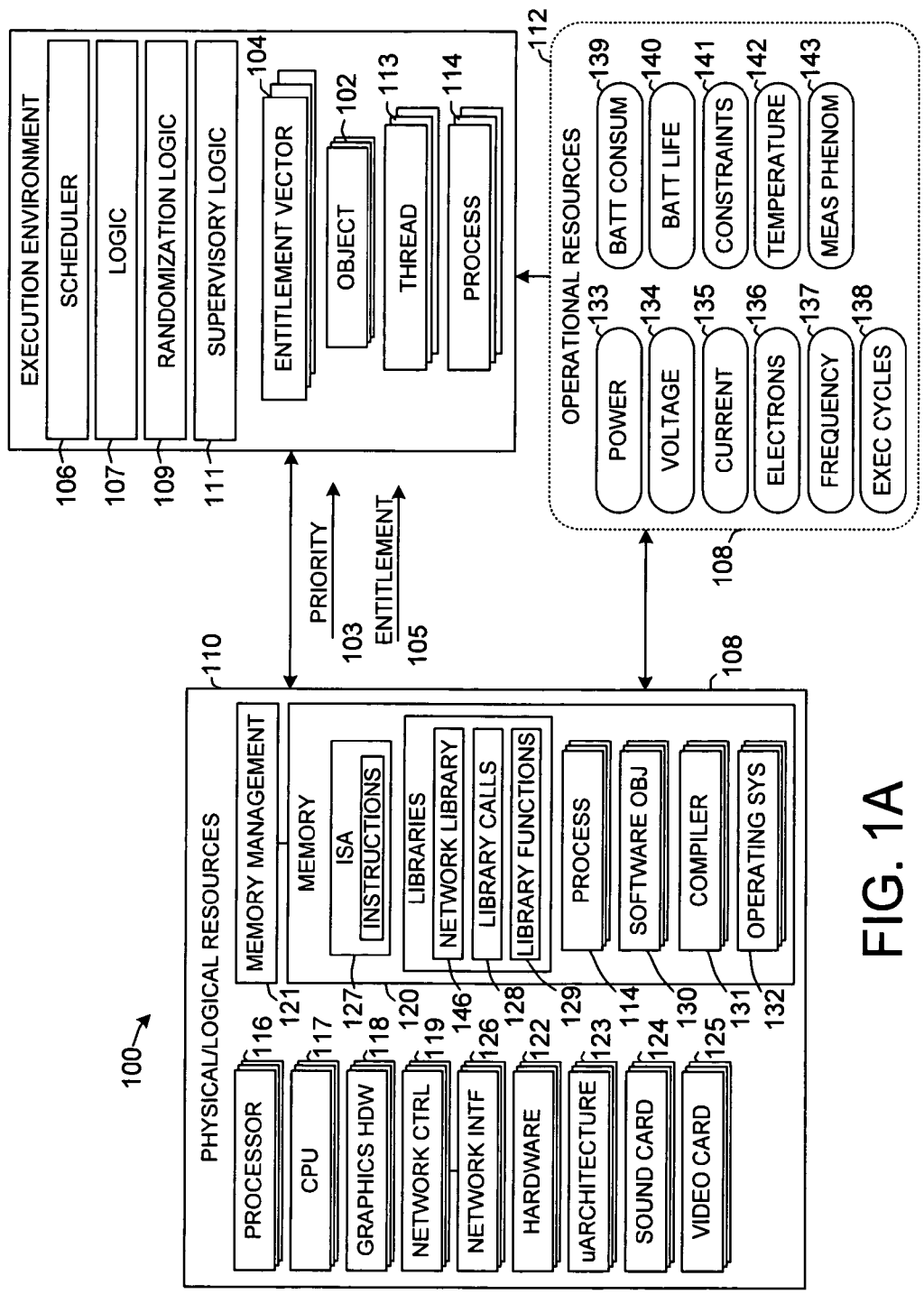
FIGS. 1A, 1B, 1C, 1D, and 1E are schematic block diagrams showing embodiments and/or aspects of an information handling apparatus that uses entitlement vectors to allocate resources to a selected priority and schedule later usage of resources to deferred objects and processes.

In various embodiments, computer systems and associated methods can be configured to include one or more of several improvements that facilitate resource handling.

Various aspects of resource allocation include hardware threading, computational limits, pooled resources, entitlements, and others. Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like.

Entitlements can be used to allocate resources. Entitlements can be defined as user-specified rights wherein a process is entitled to a predetermined percentage of power or of time. A scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible.

A metric can be specified which enables modification of a goal. A selected level of entitlement to resource consumption can be assigned to each process. One example scheme can be a short, low complexity method which is implemented while storing a limited operation history. For example, when running low on battery charge, a sequence 1-2-3-4-4-3-2-1 can be used to determine whether any of the processes is a resource glutton and can rank the processes on order of gluttony. The most gluttonous can be assigned the lowest priority. Another option can rank processes according to gluttony in combination with another factor of goodness (niceness). Processes can be ranked for the next cycle with the most gluttonous given last priority or can be ranked according to gluttony and one other nice system criterion. Monitoring and/or control can be performed highly efficiently if hardware, although either monitoring can be performed either in hardware or software in various embodiments. Power management units in CPUs can be used for monitoring, for example to monitor for increases or decreases in voltage or frequency, and for thread execution selection.

Capabilities can be used to perform monitoring and allocation of resources. For example, granting the capability to run video processing software can be combined with simultaneous granting of power capability.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

Processors can use instruction prefetch to improve execution speed by reducing wait states. The processor prefetches an instruction by request from main memory before the instruction is needed and, when retrieved from memory, placing the prefetched instruction in a cache. When needed, the instruction is quickly accessed from the cache. Prefetch can be used in combination with a branch prediction algorithm which anticipates results of execution to fetch predicted instructions in advance. Prefetches conventionally operate independently. In some embodiments, a processor disclosed herein can prefetch according to holistic monitoring of operating conditions such as voltage, frequency, and the like to more accurately determine or predict which instructions to prefetch.

The cache can be reconfigured dynamically, for example beginning with a single large, slow cache which can be divided into a relatively small subcache and a larger subcache to enable faster operation. In embodiments disclosed herein, operating characteristics can be monitored to generate information for dynamic reconfiguring of the cache. As a result of the monitored operating conditions, the cache can be selectively configured for slower or faster speed, larger and smaller cache subregions. In some conditions, part of the cache can be temporarily disabled, for example to save power. Monitoring of operating conditions can enable a suitable balance of considerations to determine whether part of the cache is to be disabled, for example determining whether the power saved in disabling part of the cache is appropriate in light of the power lost with a greater cache miss rate.

Disclosed system and method embodiments can use operating condition monitoring and holistic control at the level of calling an object. In an object-level paradigm, various objects or values (such as numbers, symbols, strings, and the like) can be combined to form other objects or values until the final result objects or values are obtained. New values can be formed from existing values by the application of various value-to-value functions, such as addition, concatenation, matrix inversion, and the like. Various objects have different impacts on system operations.

An example of an object which, when called, can have large consumption of power or other resources is video encoding which is a brute force, unintelligent algorithm which runs much more efficiently on dedicated hardware than a general CPU, and has real-time constraints. Video conferencing has similar real-time constraints.

Another object example is video games which perform many different tasks concurrently including processing geometry and processing video simultaneously, possibly processing speech for Skype communications, voice compression, input/output, and the like. Video games thus typically involve concurrent operation of multiple objects such as the game processing tasks and interface (Application Programming Interface, API) that perform different actions separately. The multiple objects are commonly run as separate threads, unless prohibitive due to the large amount of overhead in running threads that are not essential. Separate threads simplify programming.

In some configurations, applications, and conditions, multiple threads can be run wherein the threads need not be run in the same context.

Hyperthreading is a particular implementation of hardware threading. Software threading is a slightly different implementation of threading wherein the threads are often, but not always, related. In some implementations, a processor can include a GOAL register that can be used to set performance characteristics for particular threads. For example, if different routines (Skype, physics) are run in different threads, selected operating characteristics for the threads can be loaded into the GOAL register to give the threads separate issues. Allocating priority to the different threads can be difficult. In an illustrative system, priority to the threads can be allocated using a NICE utility which specifies acceptable performance for a particular operation and allows reduced priority in appropriate conditions for tasks that can be assigned lower priority with little or no consequence.

In an example implementation, priorities, particular types of priorities, and entitlements can be associated with particular library routines to facilitate management of relatively heuristic phenomena. A library can be constituted wherein entitlements are assigned to individual library routines. The library includes information for adjusting the priority of threads. In some configurations or applications, the library can support hint vectors, such as branch prediction hints to specify whether static prediction should be taken or not taken. In some embodiments, the library can be configured to support NICE-type handling of a hint vector.

A process scheduler can be constituted to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

Entitlements can be used to specify operations of a library. For example, a library with entitlement to run a predetermined number of floating point operations per second can, in response to a condition of executing instructions with few or no floating point computations, use the condition as a hint to power down floating point hardware, thus saving power. Thus, if computations include fixed point operations but no floating point operations, an a priori indicator can be generated designating that the floating point hardware is not needed in the near future and can be powered down. A process can call a library and, if known that a resource is not needed, the resource can be temporarily halted, thereby changing the entitlement level of that process with respect to the resource (for example a floating point unit) to a very low point.

In the illustrative example, the entitlement level of the process with respect to the floating point unit can be changed to very low because the resource is not needed for a foreseeable duration. The process thus indicates to other processes a willingness to relinquish access to the source, for example a willingness to be "nice" about allowing others to use the resource, so that access is deferred in favor of any other process that uses the resource, or the resource is shut down if not currently needed by another process.

Rather than have hardware determine demand for a resource after instructions have been executed, the illustrative system and method can use a call to a library or the result of making a call to the library as an indicator of entitlement niceness. This entitlement can be enforced in the manner of capabilities, for example by requesting access to a memory region, a request which may be denied. The library can give information regarding entitlement, thus giving a priori knowledge.

Resource allocation can also be managed using hints. An illustrative instruction that uses a hint is a hint that not much floating point computation is to be performed, a hint indicative of power demand. For example, hints to maintain power at a low level or to maintain power at a high level. An exception can create problems when using hints, since a hint is not unwound in the event of an exception. For example, for a hint to maintain high power, an exception which changes the condition but does not reset the hint allows hardware to remain in a high power mode, potentially forever. Examples of problems with hint processing in conditions of context switching include problems with unlocking memory locations.

In contrast to entitlements, capabilities enable mechanisms to unwind.

Entitlement Vector.

An entitlement vector may comprise multiple fields that are respectively directed to multiple different resources or capabilities. General examples may include, for example, floating point, power, arithmetic logic unit (ALU), graphics triangle computations, translation lookaside buffers (TLBs), virtual memory usage, and the like. The entitlement vector can thus be used, for example, to power down the TLB as no longer relevant to operation, or to enable usage of a wide range of virtual memory. Software can determine values for each of these fields, for example after monitoring, or the fields can be preconfigured. To maintain in hardware, an entitlement vector may be a suitable size, such as 256 bits. Values can be Boolean. Otherwise, values can be a number from a numerical range to indicate how much from a percentage or relative sense of a given resource is being requested. For example, a big number may be placed in an ALU field if significant usage of the ALU is expected.

Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multithreading environment in terms of aspects such as priority.

In some embodiments, an entitlement vector can be used as a hint for an object. Software or a manual determination can ascertain and/or specify what resources/capabilities are to be used by an object, such as a library. Code may be included, for example at the beginning of a library, to request particular resources in the form of an entitlement vector. The request may be a request for preferential scheduling, especially with regard to resources. Such code may be a hint, a data structure, a set of one or more bits, or the like in the library.

In some embodiments and/or applications an entitlement vector can be operable as a repercussion of a calling library. An entitlement vector can serve as a request for resources. The request may be realized as a call to a system call, such as a request to the operating system to allocate additional resources. A hint instruction can be provided to hardware, for example for hardware to use in scheduling. When a library call is made, an entitlement vector may be returned. An entitlement vector can be returned directly or by reference to an address/register location. Otherwise, an entitlement vector may be installed, for example in association with a register, as a result or side effect of making the library call.

An entitlement vector can be configured to handle field of scale. Human perception is limited. For data representing phenomena that are to be perceived by humans, the data size may be limited so that precision beyond what is human-perceptible may be omitted to conserve resources. Accordingly, a requested data resource can be scaled down or set to a maximum size. For example, finger prints do not require greater than 2 MB, and eyes can discern only "x" amount of resolution. Scale may also be applied to other parameters having a relevant precision that is constrained by the physical world. Thus, a field of the entitlement vector can specify scale. Examples of scale can be human scale, width of the accumulator, or any suitable scale. For example, for a finger print, a suitable scale can be no more than 2 MB.

The entitlement vector field can have a suitable predetermined data path width. Communication and computational data path widths may be large to accommodate data-intensive activities. A data path width entitlement vector field may request a reduction to or only a portion of a maximum available data path width. For example, perhaps only 128 bits of 1024 bits are needed. The other bits of the non-used data path width may be shared with another process or shut down to conserve energy. For example, a portion of a power-hungry super accumulator may be powered down in response to a data path width indication in a field of an entitlement vector.

Thus, a field of the entitlement vector can be data path width, a similar concept to scale. A large instruction size, for example 1024 bits, wastes power, but typically only a portion of the bits are used at one time so that a desired subset of the bits can be activated, changing the data path width. The scale concept leads to the concept of a selected partial data path width. The data path width is part of the entitlement. For example, of 1024 bits logic can compute the number of bits actually needed and allocate that predetermined subset of bits, such as 128 bits. The data path field thus can be used to lower the data path width used of the available entitlement vector width, for example activating a super-accumulator data path width.

An entitlement vector can also be used to supply information for scheduling. Individual instruction pointers or threads can be associated with an entitlement vector. For example, four instruction pointers (IPs) can be associated respectively with four entitlement vectors. Logic for a thread chooser can schedule a next thread for execution based at least partly on an entitlement vector. Hence, an entitlement vector may affect priority of scheduling. For example, a glutton with low priority may be moved toward the back of a queue. A miserly resource user with a high priority, on the other hand, can be moved toward the front of the queue.

The entitlement vector can enable usage of selected scheduling functions. Different functions can be used to schedule threads with regard to entitlement vectors. Generally, a function (i) can be based at least partly on: a weight, an entitlement vector$_i$, and a usage level$_i$. A function can be, but is not necessarily, linear. For example, a sum of a product of a weight times an entitlement vector may be compared to a usage vector when considering priority for scheduling threads.

An entitlement vector and usage vector can be mutually associated. An entitlement vector for an object can be set by software. A usage vector may be determined by hardware by monitoring resource usage during execution. An entitlement vector and a usage vector can be combined into an uber-priority vector that can be used when scheduling threads.

In an example software embodiment, software can monitor the system over history, or can be preprogrammed, and fills in some sets in entitlement vector fields. Software can determine values for the fields and fill in the bits of data, possibly associated as a lookup table, an associated hash table, an extra field to call for a library, and the like. For a library call, an entitlement vector EV is returned. The entitlement vector can be received from various sources, for example from external to calling software. For example, the entitlement vector EV may be installed into hardware as a side effect of the library call.

A factor in determining whether the entitlement vector is handled in software or hardware is the size of the vector.

In an example hardware implementation, a suitable entitlement vector size is 256 bits, although any suitable size is possible. For example, a vector of 64K bits is generally considered too large for hardware implementation.

In some embodiments, an entitlement vector can be associated with each library. The entitlement vector can be used, for example, to eliminate floating point if desired, reduce the number of floating point operations if such operations are rarely used, reduce the scale as appropriate when full accumulator width is unnecessary, increase support for the ALU.

The entitlement vector can be implemented as a call with a memory address made in association with a call to a library which, for example, can return a pointer or address location to the entitlement vector.

Another field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

An example function using an entitlement vector (EV) can compute the sum of weight$_i$ times $EV_i$ compared to the usage vector of Thread$_i$, a simple target function for evaluating when to schedule threads from the highest priority to the lowest priority. Thus, for a thread with high priority and large requirement for resources, the thread can be elevated in the scheduling list and resources are likely to be allocated. In contrast, a thread that is a glutton for resources and has low priority is likely to be deferred by the scheduler, moving back or to the end of the list of scheduled threads. A high priority thread that consumes only limited resources is likely to be moved up in the schedule list, possibly to the front of the list.

In some embodiments, the entitlement vector supplied by a HINT instruction can be modified by a capability process. Illustratively, the entitlement vector can set entitlement to use X resources which can be limited by the operating system for example by reduced weighting or setting of maximum allowed resources. The entitlement vector can also be limited according to usage, wherein a thread using an inordinately large amount of resources can be limited when the high usage is detected or predicted.

The entitlement vector function $F_i(w_i, EV_i, v_i)$ of weight $(w_i)$, entitlement vector $(EV_i)$, and resource volume $(v_i)$ can be either linear or non-linear.

The entitlement vector enables association of scheduling with functions. The entitlement vector further enables association of priority with functions.

One of the challenges in allocating resources is the potential for highly unpredictable changes in resource demand. For example, minor changes in workload can result in substantial variation in performance. Another challenge is unpredictable behavior in response to context switches from one process to another. One technique for dealing with these challenges is making a library call as a technique for determining whether a context switch occurred or, if not expecting to make a library call, perform an action that randomizes priority. If degradation results from making the library call, then performance can be monitored to determine whether performance is reduced. If so, priority of the threads can be randomized. Example techniques for randomization can include a Boltzmann search, simulated annealing, hop-around, other lateral computing techniques, and the like. A Boltzmann search can be performed by a Boltzmann machine, a stochastic recurrent neural network that is capable of learning internal representations and solving combinatoric problems. Simulated annealing is a computer technique used for answering difficult and complex problems based on simulation of how pure crystals form from a heated gaseous state. Instead of minimizing the energy of a block of metal or maximizing strength, the program can minimize or maximize an objective relevant to the problem at hand, specifically randomization to attain stable performance. In a hop-around technique, priority or other parameters can be bounced around to determine a local maximum but not global optimum. Search optimizations can be used to determine whether truly at a maximum value. The new results can be compared with an old optimum.

In some embodiments, a supervisor circuit, for example for thermal and/or overvoltage protection, can modify the entitlement vector.

Entitlement Vector for Power Control Monitoring.

The entitlement vector, for example in combination with a usage vector, can be used for monitoring power control. In various embodiments, power control monitoring can be performed remotely or locally, possibly by the operating system.

In an example embodiment, a user can supply an entitlement vector using instructions, for example by specification of the beginning and end of a function. The entitlement vector can be used in association with a performance monitoring unit which monitors and determines other entitlement vectors. In various embodiments, the entitlement vectors can be maintained separately or combined into a single effective entitlement vector.

Context Switches.

Context switches can be defined as switches from one process to another. In contrast, a thread can typically be considered limited to a single context. Standard threads and mock threads share resources including context and can have multiple processes, multiple threads within the same privilege level technically. However, a threading library and threading operating system can be created wherein threads are not limited to the same context. Threads can comprise simply a stack and an instruction pointer, and can run in the same address space, for example threads can run as different users in the same address space. In a case of multiple users accessing the same database, if the database is a shared-memory database, software or an interpreter can be responsible for ensuring that unauthorized user(s) cannot access certain data. In the case of users assigned different privilege levels or different threads in the same virtual memory address space assigned different privilege levels, different registers are assigned to particular users and/or threads, and thus switches between users and/or threads are context switches.

Privileges can be associated with a page, a page table, an actual physical memory address, a virtual memory address, and the like.

Combining Capabilities and Entitlement.

In some embodiments, the capabilities vector and the entitlement vector can be merged. In some aspects of operation, entitlement can be considered to be a capability. With entitlements specified, the associated performance capabilities and management of associated capabilities prevents unauthorized access to data and/or resources, and prevents system takeover, unless specifically allowed or enabled by a system call, improving security and enabling denial of service to attacks.

Merged capabilities and entitlement can be used to prevent microarchitectural denial of service. Denial of service is typically considered to arise from a hacker on a network blocking access by using up all or a substantial part of network bandwidth. For example, when operating on a virtual machine in a cloud computing platform (such as Amazon Elastic Compute Cloud (EC2)) a job can be run that thrashes the cache, resulting in an architectural denial of service in response. Preventative remedies can include checking for performance counters and preventing such unauthorized accesses. Microarchitectural remedies can also be used such as implementing microarchitectural covert channels in which, for various types of code, secret keys running on the same virtual machine can be detected. Similarly, microarchitectural covert channels can be used to monitor timing of code to detect intrusion and to detect whether a bit is set in a particular bit position which may indicate intrusion. Microarchitectural techniques can thus include timing channels and covert channels for use whenever a shared resource is to be modulated. Covert channels can be applied, for example, in modulating a disk arm, detecting seeks on a file system.

In various embodiments, operations implementing and using the entitlement vector can be executed by software in a processor, by microcode, in logic, in hardware, or the like.

Hardware Threading.

Several aspects of hardware threading are currently implemented in processors such as CPUs. Simultaneous threading (SMT), hyperthreading, or simultaneous hyperthreading relate to hardware execution of two or four threads selected for running at any time, managed according to many fine-grained scheduling decisions. In a cycle, two threads are selected at instruction fetch, typically at the front of the pipeline and hardware determines which of the two thread's instructions to fetch. An instruction for each of the threads pass to an out-of-order machine within which the instructions are running concurrently. For example, an arithmetic logic unit (ALU) instruction from thread 1 and a memory instruction from thread 2 can run simultaneously.

Another type of hardware threading is interleaved multi-threading (IMT) which removes all data dependency stalls from the execution pipeline. One thread is relatively independent from other threads so the probability of one instruction in one pipeline stage needing an output from an older instruction in the pipeline is low. IMT is conceptually similar to pre-emptive multi-tasking used in operating systems.

In contrast to CPU multithreading which handle relatively few threads (typically two or four threads), graphics processing units (GPUs) are stream processors for computer graphics hardware and manage hundreds or thousands of threads, thus using much more sophisticated scheduling. When blocking occurs, for example on a cache miss such as from a memory reference, a very large number of threads are blocked. Threads are chosen for execution on massively parallel thread arrays. In a typical arrangement, a processor has approximately 64,000 threads of which only about a thousand execute at one time. Underlying operations during execution include scheduling, addressing cache misses, and the like. Rather than scheduling from a memory pool, GPUs schedule instructions for execution from a very large pool of threads, waiting for memory to become available to run the next thread.

A CPU can be configured for a CPU thread hierarchy which includes a currently running list and a pool of non-running threads enabled to receive information pertinent to computational limits from devices or components such as special-purpose hardware.

Computational Limits

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

Addressing computational limits can be fairly complex, involving not only information from monitored resources but also user input. For example, a determination by hardware of low battery level and associated limited battery life can be overridden by a user who may request a software application to run in anticipation of being able to soon recharge the battery at a line power source.

Performance Capabilities

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A hardware scheduler can respond to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call.

Furthermore, software can associate capabilities with particular objects such as libraries.

In an example embodiment, a software model can be configured to use and enforce performance capabilities. In a relatively simple operation, if power is too low, then the software can limit the maximum number of threads or other capabilities. For example, in a cell processor case the number of threads can be limited to less than 1000. Fundamentally, software can disable functionality if sufficient power is unavailable for scheduled operations.

In another example, a sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

An example of performance capability monitoring and management can be implemented in a CPU with four process threads each having instruction pointers. One of the four threads is selected to execute for next instruction cycle. Various types of information can be monitored to determine which thread to select including recent demand for power, memory, CPU cycles, and the like. For example, a process can be a resource glutton and allocated fewer resources to enable other processes priority. Information is available relating to recent performance, requested performance, and acceptable performance (niceness).

Another option is to use a "NICE" instruction which can be used to adjust the priority level of predetermined instructions, enabling the instructions to be run in the background at a convenient time. For example, if a processor or battery is running too hot, the NICE instruction can reduce the urgency of executing code. In a particular example implementation, the NICE instruction can change a multiplier and step of a decay algorithm.

High and low capabilities can be specified. For example, a particular software routine can sometimes, although rarely, use floating point operations so the capability for such routines can be set low. Operations performed by software can include monitoring, configuring parameters, and the like.

A predictive hint can also be used to allocate resources. For example, a software routine can use a hint a prediction of a significant amount of floating point usage. A HINT instruction can be included in the routine. In another version, at the beginning of a library function, code can be inserted to enable predictive preferential scheduling. The HINT instruction can be part of the library, for example at the beginning, or associated with the library. Code can be inserted in the library, such as at the beginning of a library function requesting particular resources, for example for preferential scheduling. In one example form, a call to a system call can request the operating system to allocate more resources. In another example form, a hint instruction can be sent to hardware to implement the hint and the hardware responds by using the hint in hardware scheduling, such as push, pop, pull, stack, or the like. The hint instruction typically has no direct effect on program execution. The program will run correctly except for changes in performance and battery life.

Predictive hints can also be implemented other than with a hint instruction. Rather than an instruction, the hint may be part of the data structure. For example, X number of bits can relate to expected capabilities to which a process can be entitled such as a vector or a structure. Software can determine information for a performance descriptor, then fills in the data so that metadata of a descriptor determines importance of the performance descriptor.

Accordingly, predictive hints can be implemented in hardware, software, the instruction set architecture, or a combination of configurations. Hardware is typically more constrained than a software implementation. A software library enables the hint to be passed in a linked list of hash trees for passage into hardware, for example as a 128-bit or 256-bit register. Such an implementation can be implemented in an application programming interface (API) but sufficiently simple to be part of hardware. Thus, the API can be designed, then simplified sufficiently to put into hardware.

Capabilities can be used to implement security. Typically, a system has only a few predetermined capabilities. However, a system can be configured in which every memory addressing register is assigned a capability. If the register specifies a capability to access the associated memory location, the location can be accessed. Otherwise, access is prohibited, for example producing a fault or incrementing counter or accumulator which can be noted in an intrusion vector. For any aspect related to security, if a test is failed, the counter is incremented and placed in the intrusion vector.

An instruction can be specified in an instruction set which sets a capability. In various embodiments, the instruction can be implemented in software, hardware, the operating system, or the like. The instruction can operate in association with a capabilities vector. In some embodiments, the instruction can also or otherwise operate in association with a hint vector.

The capabilities vector can be associated with a pointer, an address, and an object. A highly basic capability is a lower bound and an upper bound. Other more complex capabilities can be implemented. In various implementations, the capabilities vector and the entitlement vector can be separate, or can be combined. Merging the capabilities vector and the entitlement vector enables software structuring.

The capabilities vector can be used to enable fine-grained permission. Fine-grained permission facilitates operations of multiple users or entities in a shared memory data base, enabling the multiple users to access storage such as disk and to perform system calls, but limit access to data only to the user who owns the data or is authorized to access the data. Another benefit of fine-grained permissions is an ability to facilitate and improve security while multiplexing software threads onto hardware threads. In an example configuration, 64000 software threads are multiplexed onto only four hardware threads. Only a small portion of the software threads are running at one time with the remaining software threads idle. The software threads alternately run on the hardware threads, then go back to idle to allow other software threads to run.

A classic security hole in a database management is the inability to limit access to data for the different software threads multiplexed onto the hardware threads. A database typically does not allocate a hardware thread to a user. In typical database operation, a request is received and placed on a software thread so that users are multiplexed onto the software threads, an action giving very little protection. Better protection is attained by allocating each user to a separate process, a technique that is prohibitively expensive because the threads are expensive. Multiplexing the users onto software threads leaves a security hole because access to a particular user's data allowed while running the user's software thread on a hardware thread is not removed when the user's software thread is swapped out from the hardware thread. The access permission remains so access remains enabled. The depicted system solves the security hole by using capabilities.

In a non-capabilities system, any of the software threads can access the entire database at any time, including any data that has been placed in shared memory (unless a call out is made through the operating system to enable any of the threads to create I/O, a prohibitively expensive operation). Simple databases only have one peer thread so all threads can access any data. Many typical databases have 64 threads that can access any data in shared memory but only four threads that can access I/O. These systems sometimes have different privilege levels (for example, Intel's rings 0, 1, 2, 3) so specify compatibility. Most code runs in ring 3 and the kernel in ring 0. Rings 1 and 2 are generally not used although several databases have features that can run in ring 1 and ring 2 but are rare and used primarily for benchmarks (a benchmark hack).

In an example implementation that uses capabilities, generally a processor has 16 or 32 registers, some of which are addressing registers. A capability can be loaded to enable access to selected threads. A capability can be loaded to access a particular thread (owned by another user) into hardware thread 0, enabling running as that user. This is one type of context switch—to change the software thread that is executing on hardware thread 0. The capability registers can then be changed, a minor context switch and a change in privilege level. The action does not invalidating translation lookaside buffer (TLBs), but rather moves the permissions out of the TLB. The access control model is also changed. Capabilities can be used in this manner to change operations, guaranteeing only access to data and/or resources for which access is allowed by a permission-granting entity. Capabilities can guarantee a transitive exposure of only the data and/or resources of another user according to granted authorization. The technique is deterministic so that, by inspection, which accesses are possible is known.

Translation Lookaside Buffer TLB.

A translation lookaside buffer (TLB) is a processor cache which can be used by memory management hardware to improve virtual address translation speed. Processors use a TLB to map virtual and physical address spaces. TLB are used widely in hardware which uses virtual memory.

The TLB can be implemented as content-addressable memory (CAM), using a CAM search key which is the virtual address to produce a search result which is a physical address. If the TLB holds the requested address—called a TLB hit, the CAM search quickly yields a match and the retrieved physical address can be used to access memory. If the TLB does not hold the requested address—a TLB miss, the translation proceeds by looking up the page table in a process called a page walk. The page walk is computationally expensive process, involving reading contents of multiple memory locations and using the contents to compute the physical address. After the page walk determines the physical address, the virtual address to physical address mapping is entered into the TLB.

A stream monitoring instruction can improve efficiency and performance of the TLB by supporting a software predictor. The instruction can be used to monitor misaligned or split access. A memory access is aligned when the data item accessed is n-bytes long and the data item address is n-byte aligned. Otherwise, the memory access is misaligned. Monitoring for misaligned access can be performed by hardware, resulting in a trap, or somewhat less efficiently by software. In practice, monitoring for misaligned access has a high false positive rate, for example approaching 90%. A predictor can be configured, for example by micro-architecture adjustment, to indicate whether the misaligned access hits are accurate.

A processor can be configured to change voltage, frequency, and/or power based on the number of cache misses. For example, logic can detect an abundance of cache misses or other performance problems, the voltage can be varied such as increased to cure the problem. The logic can dynamically adjust operating parameters according to the amount of traffic. Frequency and voltage can be adjusted, for example whenever a change in frequency occurs, the voltage can be modified accordingly.

Logic in a memory interface can detect when memory is full to some threshold level, for example 70%. If memory is full to the threshold level and a high level of access is occurring, memory speed can decrease. In response, the frequency and voltage of operation can be dynamically increased to maintain a desired memory speed.

In various embodiments, logic for performing dynamic adjustment can be positioned in memory, in a logic interface, in a processor. A hardware configuration can optimize by active adjustment, redirection, or possibly a combination of adjustment and redirection. For example, a computation-intensive process with many instructions to be executed rapidly can be addressed by running the processor at a higher rate by increasing operating frequency and voltage, and/or some of the burden can be shifted to components other than the processor to maintain processor execution at a lower frequency.

Infrastructure.

An infrastructure configured to support multiple processors in a system can have a shared memory and message passing between threads, processes, processors, and the like. Operating systems (OS) can include various mechanisms to enable message passing, for example pipelines, daemons that use sockets, loopback, and the like. Any suitable number of processors can be supported in the system, from relatively small systems with few processors to large scale systems with hundreds of thousands or millions of processors. In a typical large scale system, the multitudes of processors communicate via fat trees which support the large amount of bandwidth demanded by the large scale system. The amount of bandwidth in different positions in the tree is variable, depending on traffic. In various other configurations, the many processors can communicate via meshes or buses, via Gigabit Ethernet, via CDMA-CE (Code Division Multiple Access—series CE), and the like. In large interconnects, the number of processors determines what functionality is attainable. For example, for more than about 1000 processors, memory can no longer be shared. At around 100 processors, memory space can be shared but cache-coherence is typically not possible and memory is thus non-cache-coherent shared memory.

Cache-coherence is generally considered to cause problems for more than about sixteen processors so that fewer processors at a first level can have cache-coherent shared memory.

For a supercomputer or other system with the large number of processors, for example more than about 1000, for which memory is non-shared, Message Passing Interface (MPI) can be used for communication. MPI uses multiple threads but does not use shared memory. The MPI multiple threads are all part of local shared memory, but no global shared memory exists. The amount of local shared memory is limited, resulting in a communications bottleneck. Supercomputer memories use Message Passing Interface (MPI) which, to a first order, includes a limited number of instructions such as send some location, buffer, end buffer, and receive some entity, buffer, end buffer, and the like. MPI is an application programming interface (API) and is thus a library call. The received entity can be, for example, a channel connecting the sender and the receiver, although channels are rarely used in MPI since channels do not scale beyond about a thousand processors. Accordingly, MPI can use commands with masks which identify which processors are to receive a message. A difficulty with MPI is that different code must be written, and a different core engine and interface, for small-scale and large-scale parallelism. Thus, send-and-receive communication such as is used by MPI is suitable if memory is shared.

What is desired is a technique for expanding send-and-receive communication more broadly. In accordance with system and method embodiments, a communications application programming interface (API) can be created that enables communication between different types of threads and hides that the threads are sharing memory. The communications API can enhance functionality of a Transmission Control Protocol (TCP) socket. The TCP socket, also termed an Internet socket for network socket, is an endpoint of a bidirectional inter-process communication flow across and Internet Protocol (IP)-based computer network such as the Internet. In some embodiments, the communications API can also incorporate functionality of MPI into that of a TCP socket. In a distributed system, a processor can communicate with a Network Interface Controller (NIC) and a send instruction puts data on a queue to send to the NIC and pass through the routing network to a specified destination. The communications API can perform communications via TCP-IP, in some configurations optimizing aspects of TCP-IP such as by ordering packets, and also via other protocols. The communications API can include send-and-receive functionality, and include one or more channels, which is operable with TCP-IP. Some of the channels can be shared memory in the form of a buffer with a counter. Some channels can connect to the NIC, some channels to TCP-IP, and some channels can have other functionality. In some embodiments, the communications API can support different types of channels. One example of a channel type is simply registers. Another type of channel can run two hardware threads with a pipeline coupled between the two threads.

The communications API can be adapted to handle the possibility of overflow. For example, for a channel implemented as shared registers, filling the registers to capacity can cause overflow to memory, which can call a trap or exception.

Another technique for expanding send-and-receive communication more broadly can comprise creating a message passing infrastructure in hardware. Speed is one advantage of forming the message passing infrastructure in hardware. For example in the case of a system call, conventionally a slow operation, hardware can be configured to support a send instruction operable to check a bit in a channel selected for the send operation to determine whether the channel is available and, if not, performing a system call by faulting to the system call. Thus, the hardware can be configured to pass execution through the operating system in response to desired conditions.

In an example embodiment, the message passing infrastructure hardware can be configured to avoid passing execution through the operating system, for example to avoid the context switch inherent with going to the operating system. In another example embodiment, the hardware can be configured to include a message passing paradigm and one core can be run in ring 0 to enable access to operating system calls. The operating system is not a separate process but rather a library call in a library. Another option is to allocate a hardware thread to the operating system.

The operating system performs a ring 0 call via a system call which, in terms of hardware implementation, can be a function call to change a bit, granting permission to change the bit, and identification of the stack from which the OS is operating. In one example implementation, the user can explicitly control the stack, for example by placing the operating system stack in a different register. In another implementation, a system call can change the instruction pointer and the stack.

The message passing infrastructure hardware implementation can, for example, include support for send and receive calls. The hardware implementation can enable faster operating speed. For particular special cases, hardware send and receive calls can be faster than a shared library call. Send and receive are global messages, supporting point-to-point communication in two-party messaging. In some embodiments, the hardware implementation can support put and get APIs to enable sending a message to a designated address asynchronously or synchronously, as selected. The designated address is in a global address space partition, not local load-store. The put and get APIs can handle access to shared physical memory by sending a request to the master or server for the designated memory location. The memory is hashed across all the global memory space. In the illustrative implementation, get and put can be system calls rather than instructions, thus facilitating global access. Because the get and put system calls are relatively resource-expensive, efficiency can be attained by communicating blocks of data, for example 64K, at one time rather than for individual bytes.

For a cache-coherent shared memory that is accessed using the put and get system calls, different schemes can be used depending on what entities are communicating. For entities which share memory, the get and put calls simply access the shared memory. For entities separated by substantial physical or network distances, the get and put calls, if unable to fulfill the call by shared memory access, by running through the same router or similar local actions can send the calls to the network interface to relay remotely, for example across the world. For shared memory, whether cache-coherent or cache-noncoherent, the put and get, and send and receive operations are relatively simple since all entities can access the same memory. More complexity arises when memory is not shared. In various embodiments, when memory is not shared different schemes can be used such as copy-on-write (copying the shared memory), creating in remote memory the shared memory that shares the same capability, an implicit in the put and get, or other options.

The message passing infrastructure thus can include hardware support for the various put and get, send and receive, or the like system calls or instructions. The message passing infrastructure can be configured to enable two threads to be forked and used with the put and get calls to enable optimum speed performance. The send and receive, and put and get instructions, as described, consume two hardware threads or might consume two passive threads.

In some embodiments, the put-get and send-receive can be combined with access bits which designate memory to which the sender is allowed access. Passing along the access bits can enable a reduction in overhead while enabling protection across processes. The overhead of switching or sending a message drops significantly because the receiver already knows the memory to which the sender has access.

An entitlement vector can be used to simultaneously manage and activate entitlement of objects and processes to various resources independently from one another. The entitlement vector can be specific to particular objects, processes, libraries, and the like and can specify entitlement, activation levels, power levels, application timers, and other aspects of operation. The entitlement vectors operate on a resource pool and enable detection and resolution of conflicts when physical resources are insufficient to address all resource requests. Accordingly, the entitlement vectors can be used to allocate resources to a selected priority and schedule later usage of resources to deferred objects and processes. Referring to FIGS. 1A, 1B, 1C, 1D, and 1E, schematic block diagrams show embodiments of an information handling apparatus 100 comprising an entitlement vector 104 operable to specify resources 108 used by at least one object 102 of a plurality of object 102. The information handling apparatus 100 can further comprise a scheduler 106 operable to schedule a plurality of threads 113 based at least partly on entitlement 105 as specified by the entitlement vector 104.

In some implementations, entitlement 105 can be set according to a predetermined algorithm which defines a "fair share" for the processes, for example round-robin, history-based, randomized, and the like, which are efficient since a large history need not be accumulated. Thus, an efficient and inexpensive hardware implementation is possible. A particular scheme can allocate modulo by bit to avoid starving a process with lower entitlement 105.

Figure 1B:
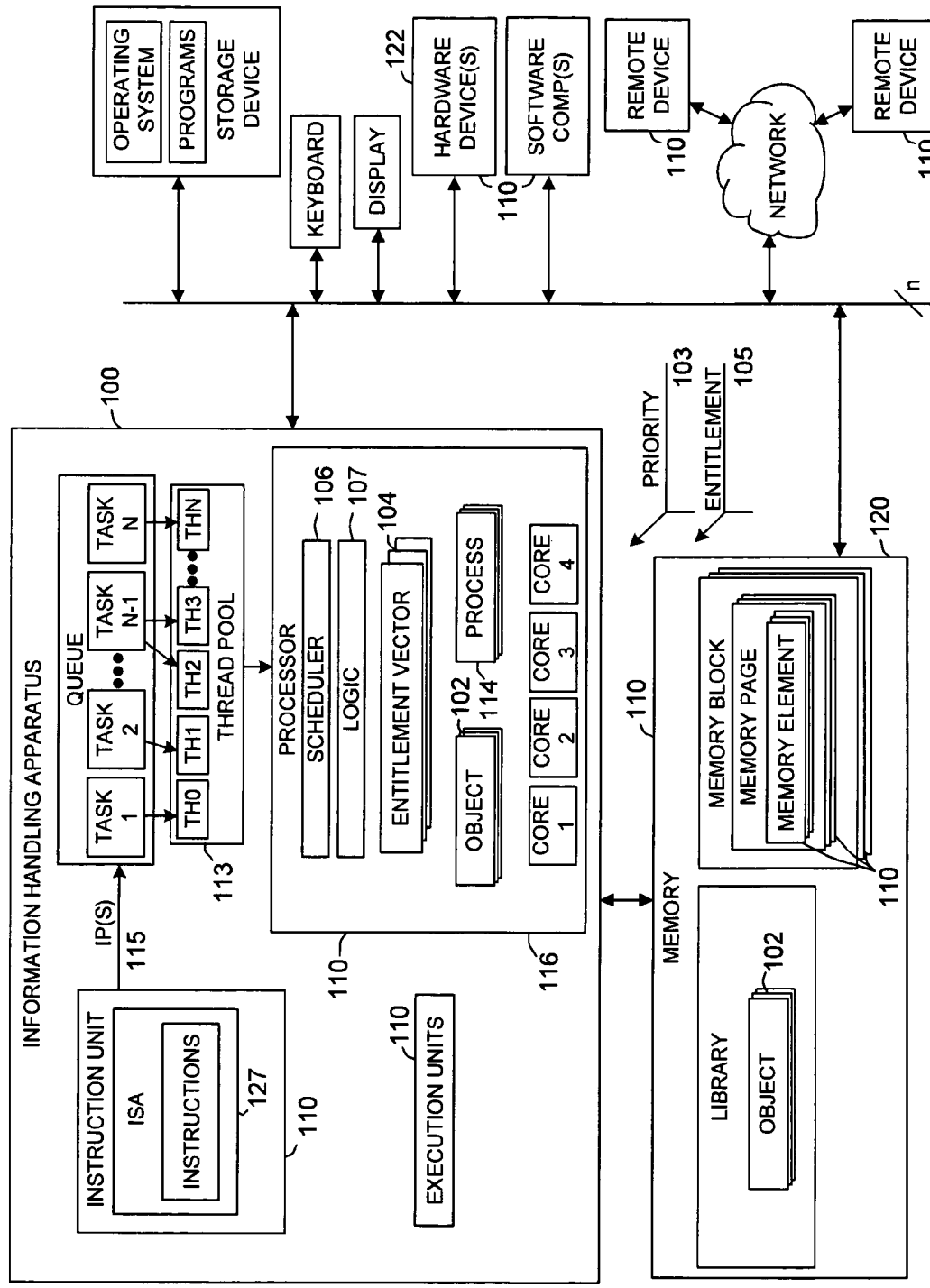
Figure 1C:
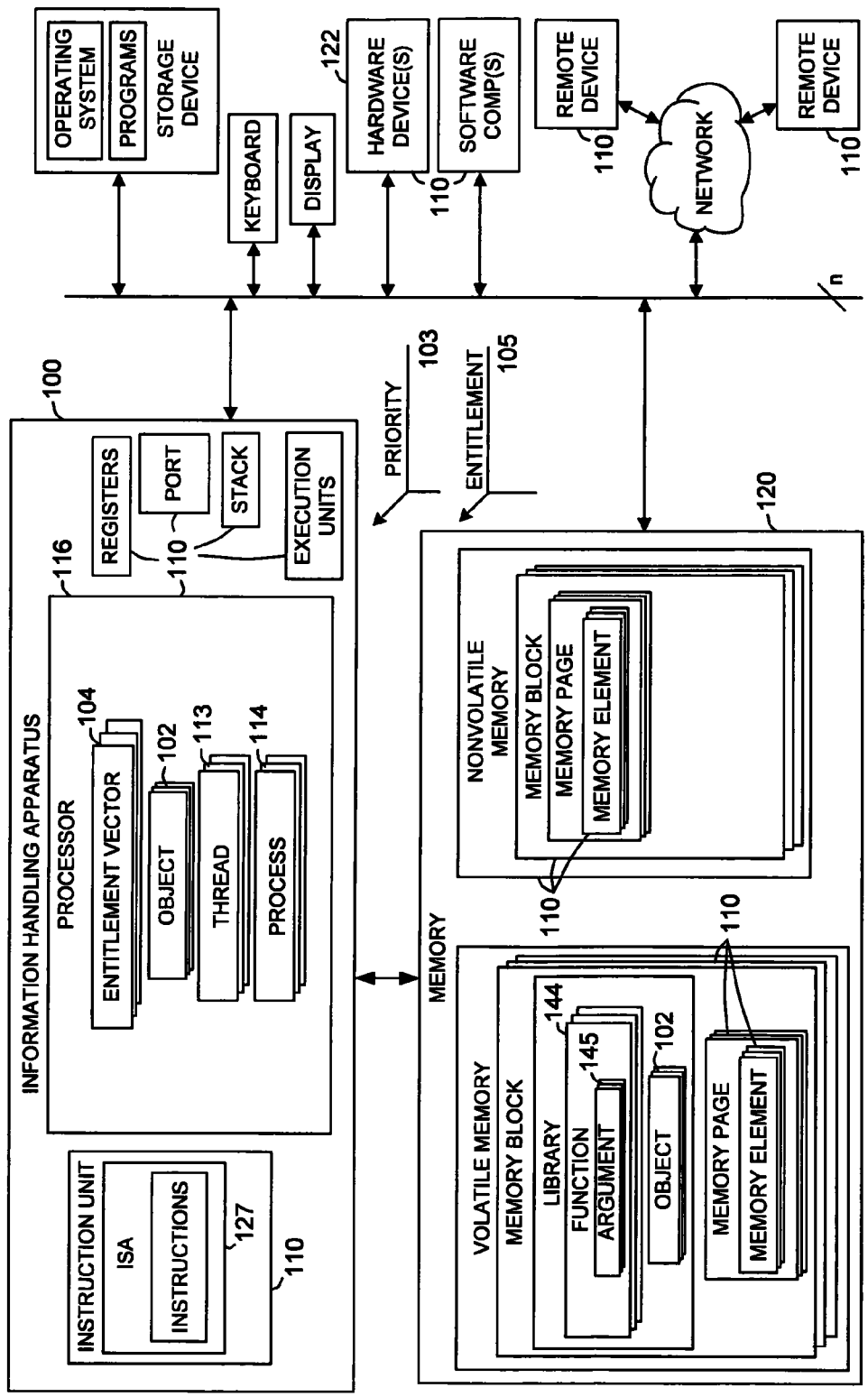

In some embodiments, as shown in FIGS. 1A and 1B, each instruction pointer (IP) or thread can be associated with an entitlement vector. For example, four IPs may be associated respectively with four entitlement vectors. For example, each instruction pointer (IP) or thread can have associated entitlement vector 104, presuming each has an entitlement vector 104. Thus, IP1, IP2, IP3, IP4 can be associated respectively to four entitlement vectors 104. Logic for a thread chooser may schedule a next thread for execution based at least partly on an entitlement vector. Hence, an entitlement vector can affect priority of scheduling. For example, a glutton with low priority may be moved toward the back of the line; a miserly resource user with a high priority, on the other hand, may be moved toward the front of the line. Accordingly, an embodiment of the information handling apparatus 100 can further comprise a plurality of instruction pointers 115 operable to indicate respective ones of the plurality of threads 103 for execution. The plurality of instruction pointers 115 and/or threads 113 can be associated with ones of a respective plurality of entitlement vectors 104.

The scheduler 106 can include or operate in combination with logic that considers the entitlement vector 104 when scheduling the next thread for computation. The logic informs the chooser about how to select threads. For example, the entitlement vector 104 can be used during choosing by elevating or reducing priority of a particular thread. In a particular illustrative simple operation, logic can compute the sum of weight$_i$ times the entitlement vector $EV_i$ which can be compared to a usage vector of Thread$_i$. The evaluation enables scheduling of highest or lowest priority for threads. A thread that is high priority and has a large resource usage is likely to be scheduled. However, a thread with low priority and very large resource usage is likely to be deferred for execution. A thread with high priority and only little resource usage is likely to be moved toward the front of an execution queue. The entitlement vector 104 can thus be used to avoid threads which are gluttons for resources. The evaluation need not be linear and can use a nonlinear evaluation function $(F_i(w_i, EV_i, v_i))$. The entitlement vector 104 thus enables association of scheduling with resource usage and dynamic functions and operation.

A chooser/thread selector can use the entitlement vector 104 by including logic that performs operations based on relative entitlement vectors 104, or possibly only a single just one entitlement vector 104. Thus, in some embodiments and/or applications, the information handling apparatus 100 can further comprise a plurality of entitlement vectors 104 respectively associated with a plurality of threads 113. The scheduler 106 can be operable to schedule the plurality of threads 113 based at least partly on mutual comparison of the plurality of entitlement vectors 104.

Logic can consider the entitlement vector 104 when scheduling the next thread 113 for computation, informing the chooser about how to select the thread 113. In various embodiments, the information handling apparatus 100 can further comprise logic 107 operable to assign priority 103 among the plurality of threads 113 using the entitlement 105 as specified by the entitlement vector 104.

Even small changes in work load can result in drastic changes to performance. Randomizing priority can modulate such changes in performance. Thus, in example embodiments, the information handling apparatus 100 can be configured such that the randomization logic 109 is operable to insert random fluctuation into the priority 103 using randomization selected from a Boltzmann search, simulated annealing, hop-around, oscillation for detecting a local maximum, comparing new to previous optimum, a lateral computing technique, and the like.

Supervisory logic can be used to modify the entitlement vector 104. Accordingly, some embodiments and/or applications of the information handling apparatus 100 can further comprise supervisory logic 111 operable to modify the entitlement vector 104 and ensure correct context of the entitlement vector 104 during context switching.

In the event of context switching that often can lead to unpredictable behavior, a library call can be employed to determine the context switch. Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multi-threading environment in terms of aspects such as priority.

A library is a collection of resources used to develop software, including pre-written code and subroutines, classes, values, or type specifications. Libraries contain code and data to enable services to independent programs, encouraging code sharing, modification, and distribution. Executables can be both standalone programs and libraries, although many libraries are not executable. Executables and libraries make references known as links to each other through the process known as linking, for example by using a linker.

For example, various embodiments of the information handling apparatus 100 can further comprise supervisory logic 111 operable to modify the entitlement vector 104 comprising a library call 128 operable to ensure correct context of the entitlement vector 104 during context switching.

If degradation results from making library call, then randomization logic 109 can randomize priority, thus stabilizing performance.

Different functions may be used to schedule threads with regard to entitlement vectors. Generally, a function may be based at least partly on: a weight, an entitlement vector$_i$, and a usage level$_i$. A function may be, but is not necessarily, linear. For example, a sum of a product of a weight times an entitlement vector may be compared to a usage vector when considering priority for scheduling threads. Functions can be used by logic when choosing threads 113 for execution, including elevating or lowering priority. Hence, referring to FIG. 1C in combination with FIG. 1E, an embodiment of the information handling apparatus 100 can further comprise at least one function 144 operable to schedule ones of the plurality of threads 113 wherein ones of a plurality of entitlement vectors 104 respectively associated with ones of the plurality of threads 113 are arguments of the at least one function 144.

The functions can use various selected arguments for scheduling execution. Accordingly, an embodiment of the information handling apparatus 100 can further comprise at least one function 144 operable to schedule ones of the plurality of threads 113 wherein ones of the plurality of entitlement vectors 104 respectively associated with ones of the plurality of threads 113 and resource usage level 147 are arguments 145 of the at least one function 144.

The function 144 can be configured to enable efficient control of scheduling. For example, if a thread 113 has high priority and large resource usage, a function 144 can be selected to satisfy such usage. However, a thread 113 with large resource usage has low priority, the function 144 can defer execution in a queue of other threads 113. For a thread 113 with high priority and only little resource usage, the function 144 can move the thread 113 to the top of a queue for immediate execution. In some example embodiments, the entitlement vector 104 can be supplied by a HINT instruction that can be modified by a capability process wherein the amount of resources can be limited, for example by an operating system which can alter a weight argument in the function 144 or set a maximum allowed resource level. Thus, in some applications and/or embodiments, the information handling apparatus 100 can further comprise at least one function 144 operable to schedule ones of the plurality of threads 113 wherein ones of the plurality of entitlement vectors 104 respectively associated with ones of the plurality of threads 113, weight 146, and resource usage level 147 are arguments 145 of the at least one function 144.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

In general the function 144 is not necessarily linear. Accordingly, various embodiments of the information handling apparatus 100 can further comprise at least one function 144 operable to schedule ones of the plurality of threads 113 wherein for a thread 113, priority$_i$ is determined by a comparison of weight$_i$ times entitlement vector$_i$ to resource usage level$_i$ over a plurality of cycles i. Thus, the function 144 can have the form, $F_i(w_i, ev_i, v_i)$.

The function 144 can be in the form of the sum of: weight$_i$ times $EV_i$ which can be compared to a usage vector of Thread$_i$. In some applications, a simple target function can evaluate and then schedule the threads 113 in an order from highest to lowest, or other selected order. Accordingly, the information handling apparatus 100 can further comprise at least one function 144 operable to schedule ones of the plurality of threads 113 wherein for a thread 113, priority 103 is determined at least partly by a comparison of a sum of weight$_i$ times entitlement vector$_i$ over a plurality of cycles i to resource usage level 147.

The entitlement vector 104 enables associating priority with functions, enabling control of threads on a per-thread basis.

Figure 1D:
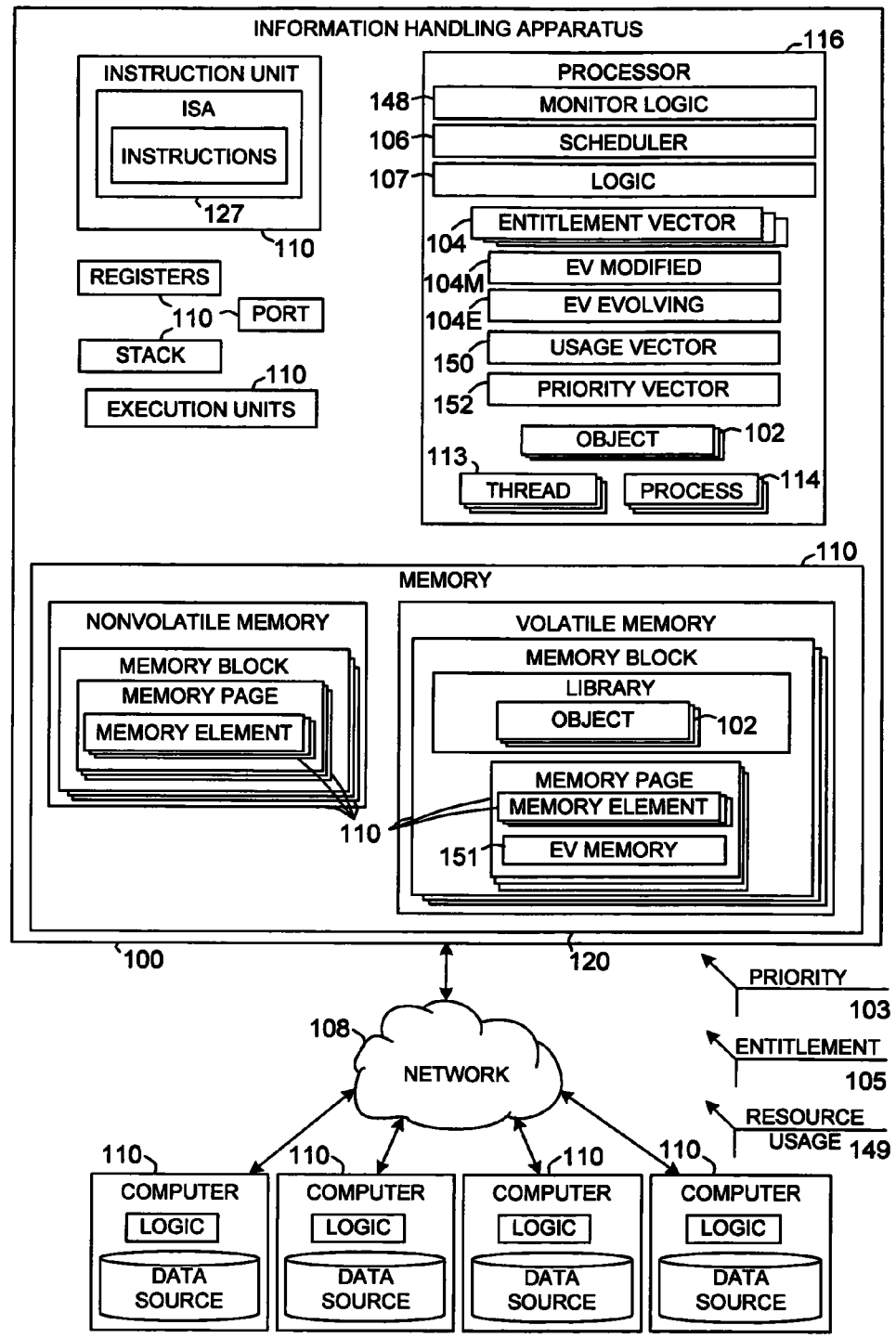
Figure 1E:
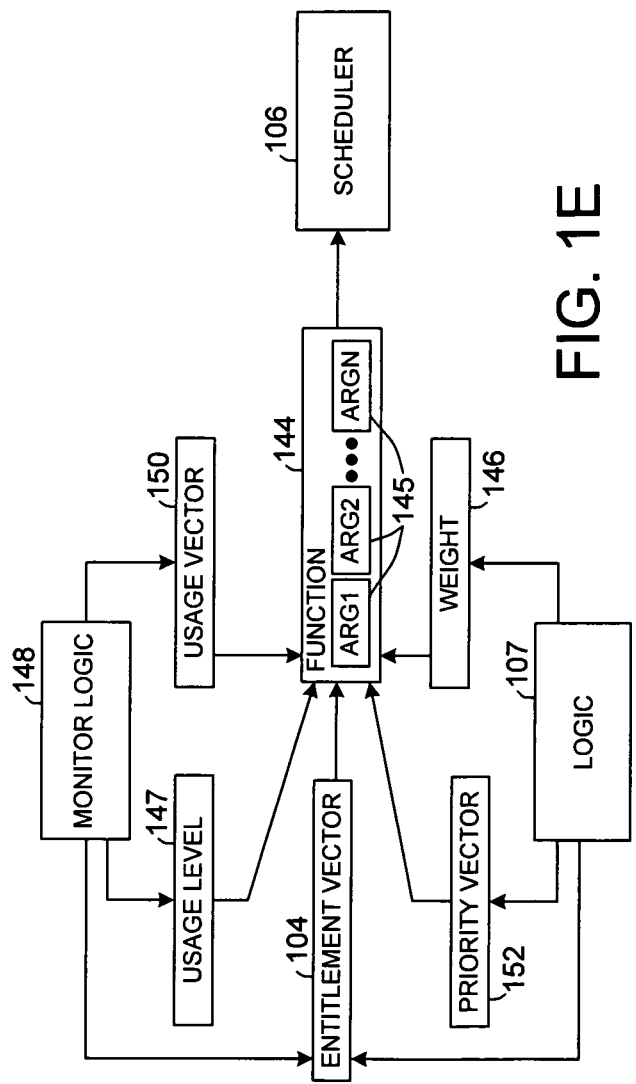

An entitlement vector for an object can be set by software. A usage vector can be determined by hardware by monitoring resource usage during execution. An entitlement vector and a usage vector can be combined into an uber-priority vector that may be used when scheduling threads. As shown in FIG. 1D, embodiments of the information handling apparatus 100 can further comprise monitoring logic 148 operable to monitor resource usage 149 during execution and indicate the resource usage 149 in a usage vector 150.

Power control monitoring can enable improved resource allocation. In some embodiments, resource allocation can be facilitated by using a usage vector 150 in combination with an entitlement vector 104.

In various embodiments, the monitoring logic 148 can be implemented remotely, locally, in a module, possibly in the operating system, or the like.

In some applications or embodiments, the information handling apparatus 100 can further comprise monitoring logic 148 operable to monitor resource usage 149 and modify the entitlement vector 104 based on the resource usage 149.

In some applications, the entitlement vector 104 can be supplied by a user, for example by specification of the beginning of execution. The monitoring logic 148 can determine conditions after execution of the function, to determine changes resulting from execution. Thus, some configurations of the information handling apparatus 100 can further comprise monitoring logic 148 operable to monitor resource usage 149, modify the entitlement vector 104 based on the resource usage 149, and compare the modified entitlement vector 104 to a user-set or default initial entitlement vector 104.

The entitlement vector 104 can be initially set, for example by a user, by a default condition, or through the operation of a process or the operating system, or the like. The monitoring logic 148 can monitor performance and possibly modify the entitlement vector 104, or derive other entitlement vectors 104. The entitlement vectors 104 can be maintained separately or merged. Thus, in some embodiments, the information handling apparatus 100 can further comprise monitoring logic 148 operable to monitor resource usage 149, modify the entitlement vector 104 based on the resource usage 149; and an entitlement vector memory 151 operable to store a history of entitlement vectors 104.

Similarly, the information handling apparatus 100 can further comprise monitoring logic 148 operable to monitor resource usage 149, modify the entitlement vector 104 based on the resource usage 149, and merge the modified entitlement vector 104M into an evolving entitlement vector 104E.

In some embodiments, the information handling apparatus 100 can further comprise a priority vector 152 operable to indicate priority 103 for scheduling a plurality of threads 113 as a function of a combination of entitlement 105 as specified by the entitlement vector 104 and resource usage 149 as specified by a usage vector 150.

Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like. Thus, in various embodiments of the information handling apparatus 100, the plurality of resources 108 can comprise physical/logical resources 110 and operational resources 112.

The entitlement vector 104 can track and/or control usage of any suitable resources 108 and capabilities. General examples can include usage of power, arithmetic logic unit (ALU), virtual memory, translation lookaside buffer (TLB), graphics triangle computations, floating point, and the like. Software and/or hardware may determine values for each of these fields, for example after monitoring, or the values can be preconfigured.

The physical/logical resources 110 of a particular information handling apparatus 100 can be one or more of physical and/or logical instances of processors 116, central processing units (CPUs) 117, graphics hardware 118, network controllers 119, memory 120, memory management 121, hardware 122, microarchitecture 123, sound cards 124, video cards 125, network interfaces 126, instruction set architecture (ISA) 127, library calls 128, library functions 129, software objects 130, compilers 131, operating systems 132, and the like.

Resources can be allocated in response to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call. Thus, in various embodiments and/or applications of the information handling apparatus 100, the operational resources 112 can be one or more entities or phenomena including, for example power 133, voltage 134, current 135, electrons 136, frequency 137, execution cycles 138, battery consumption 139, battery life 140, constraints 141, temperature 142, and measurable phenomena 143, and the like.

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

A sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

The entitlement vector can be used to enable dynamic runtime updating of an entitlement vector. The entitlement vector can be used to track resource usage by an object or process. Through updating of the entitlement vector and application of the entitlement vector to instruction execution, dynamic updates are applied to instructions. In some embodiments and in some conditions, for example defining an initial state, the entitlement vector can be initially set, for example as supplied by a user or set to a default condition. Similarly, the entitlement vector can be set by specification of the beginning and the end of the function, for example to determine the final condition. The entitlement vector can also be dynamically derived or monitored through performance monitoring, such as monitoring of resource usage and determining the entitlement vector used by active objects and functions, and dynamic control of other entitlement vectors that may not be directed related to the active objects and functions.

Figure 2A:
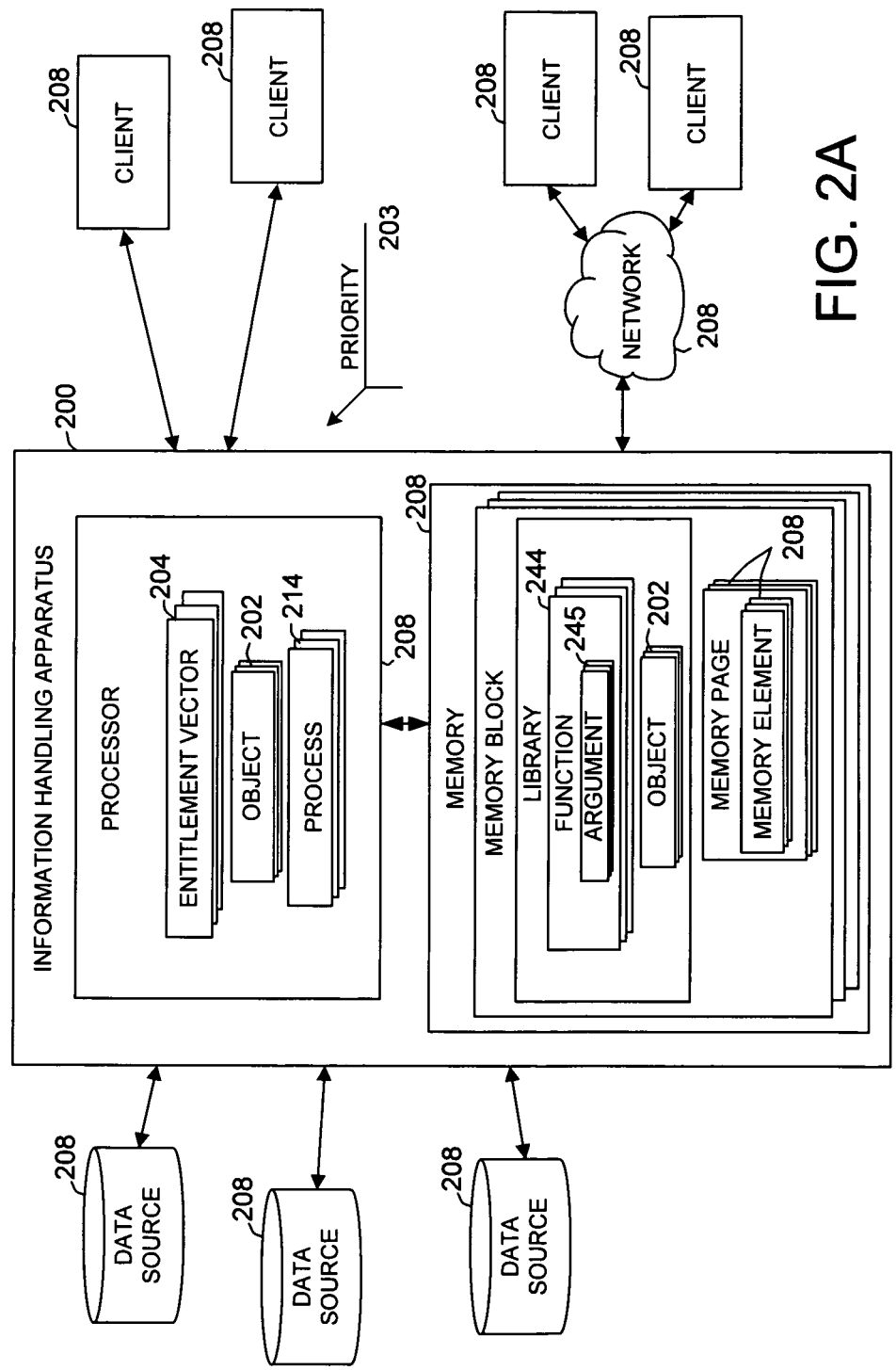
Figure 2B:
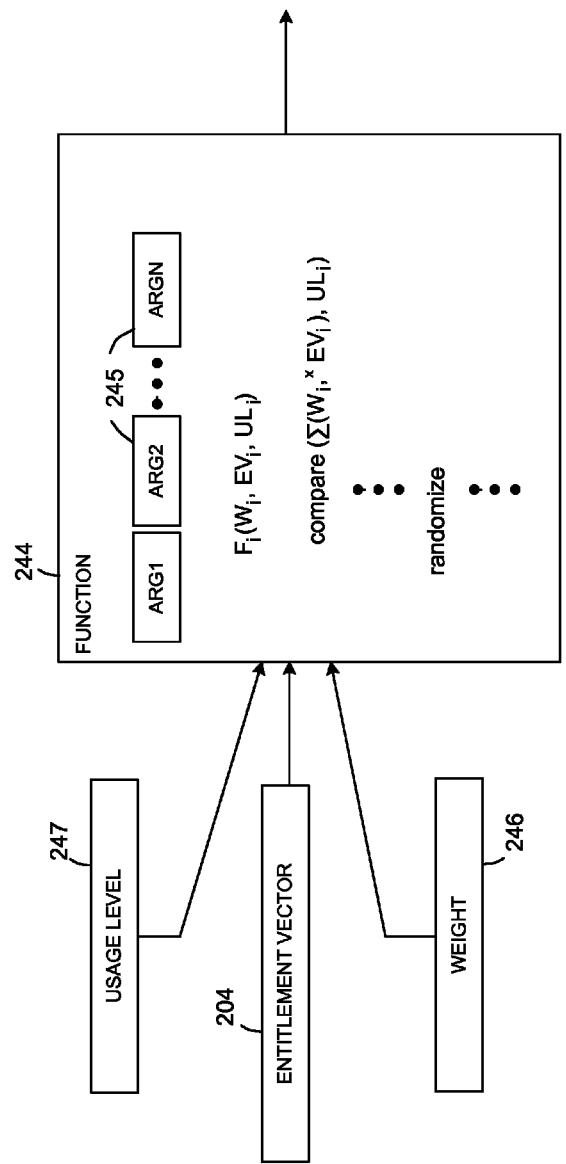

Threads can be scheduled with respect to associated entitlement vectors using various functions of arguments such as entitlement, usage, priority, weighting, and the like. Functions can be either linear or nonlinear. Accordingly, as depicted in FIGS. 2A and 2B, schematic block diagrams illustrate an embodiment or embodiments of an information handling apparatus 200 that comprises a plurality of entitlement vectors 204 operable to specify resources 208 used by at least one object 208 of a plurality of objects 202. The information handling apparatus 200 can further comprise at least one function 244 operable to schedule a process 214 of a plurality of processes 214 wherein ones of the plurality of entitlement vectors 204 respectively associated with ones of the plurality of processes 214 are arguments 245 of the at least one function 244.

In various embodiments, the function 244 can include arguments 245 indicative of various aspects of operation and performance. For example, the arguments 245 can include entitlement vectors 204 and resource usage level 247, and information handling apparatus 200 can be configured wherein the at least one function 244 is operable to schedule ones of the plurality of processes 214 wherein ones of the plurality of entitlement vectors 204 respectively associated with ones of the plurality of processes 214 and resource usage level 247 are arguments 245 of the at least one function 244.

In some embodiments, the function 244 can include arguments 245 such as weight 246. Thus, the information handling apparatus 200 can be configured such that the at least one function 244 is operable to schedule ones of the plurality of processes 214 wherein ones of the plurality of entitlement vectors 204 respectively associated with ones of the plurality of processes 214, weight 246, and resource usage level 247 are arguments 245 of the at least one function 244.

In other example applications and/or embodiments, the function 244 can specify a comparison of the product of weight 246 and entitlement vector 204 with resource usage level 247. Accordingly, the information handling apparatus 200 can be constituted wherein the at least one function 244 is operable to schedule ones of the plurality of processes 214 wherein for a process 214, $priority_i$ is determined by a comparison of $weight_i$ times $entitlement vector_i$ to resource usage level, over a plurality of cycles i.

The function 244 can specify that operations are tracked over multiple execution cycles. Hence in some embodiments and/or applications, the information handling apparatus 200 can be formed such that the at least one function 244 is operable to schedule ones of the plurality of processes 214 wherein for a process 214, priority 203 is determined at least partly by a comparison of a sum of weight, times entitlement $vector_i$ over a plurality of cycles i to resource usage $level_i$.

Figure 3:
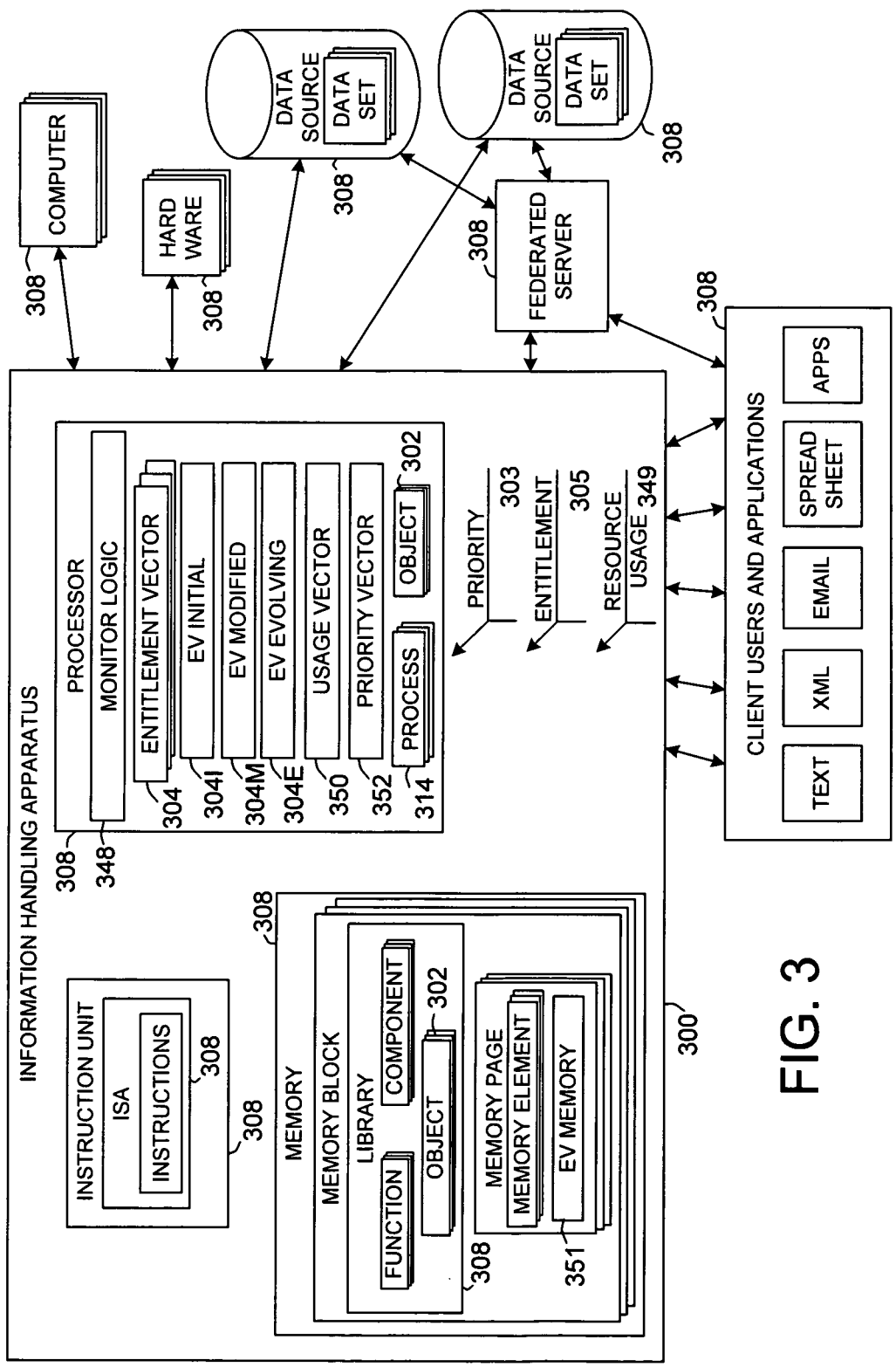
FIG. 3 is a schematic block diagram which depicts an embodiment or embodiments of an information handling apparatus configured to dynamically modify an entitlement vector during execution to improve resource allocation according to resource usage.

The entitlement vector can be dynamically modified during execution to improve resource allocation according to resource usage. For example, a usage vector can be determined by logic which monitors resource usage during execution. An entitlement vector and a usage vector can be combined to form a priority vector to handle scheduling of threads and processes. Hence, as depicted in FIG. 3, a schematic block diagram illustrates an embodiment or embodiments of an information handling apparatus 300 comprising an entitlement vector 304 operable to specify resources 308 used by at least one object 302 of a plurality of objects 302, and monitoring logic 348 operable to monitor resource usage 349 during execution of a plurality of processes 314 and indicate the resource usage 349 in a usage vector 350.

In some embodiments the resource usage 349 can be developed over time during execution and used to dynamically modify the entitlement vector 304 independently of direct user management. Accordingly, the information handling apparatus 300 can be configured wherein the monitoring logic 348 is operable to monitor resource usage 349 and modify the entitlement vector 304 based on the resource usage 349.

The monitoring logic 348 enables recursive analysis of performance. For example, an initial entitlement vector 304I can be set by a user, default, or other technique and compared to a modified entitlement vector 304M which is produced by monitoring resource usage 349. The comparisons can be made periodically between the entitlement vectors 304 at different times. Thus, the information handling apparatus 300 can be arranged such that the monitoring logic 348 is operable to monitor resource usage 349 and modify the entitlement vector 304 based on the resource usage 349. The monitoring logic 348 can further be operable to compare the modified entitlement vector 304M to a user-set or default initial entitlement vector 304I.

Similarly, a history of entitlement vectors 304 can be acquired and stored to enable further analysis and resource management. Consequently, the information handling apparatus 300 can be formed wherein the monitoring logic 348 is operable to monitor resource usage 349 and modify the entitlement vector 304 based on the resource usage 349. The information handling apparatus 300 can further comprise an entitlement vector memory 351 operable to store a history of entitlement vectors 304.

In various applications and/or embodiments, multiple entitlement vectors 304 can be acquired sequentially and selective merged. For example, the information handling apparatus 300 can be configured such that the monitoring logic 348 is operable to monitor resource usage 349, modify the entitlement vector 304M based on the resource usage 349, and merge the modified entitlement vector 304M into an evolving entitlement vector 304E.

The dynamically modified entitlement vectors 304 can be combined to express priority in a priority vector 352. Hence, the information handling apparatus 300 can further comprise a priority vector 352 operable to indicate priority 303 for scheduling a plurality of processes 314 as a function of a combination of entitlement 305 as specified by the entitlement vector 304 and resource usage 349 as specified by a usage vector 350.

Figure 4C:
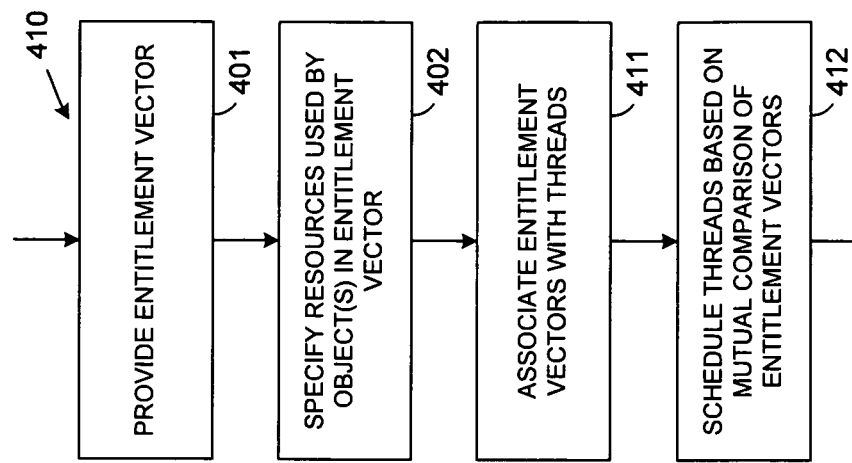
FIGS. 4A through 4R are schematic flow diagrams depicting an embodiment or embodiments of a method operable in an information handling apparatus adapted to facilitate resource allocation using an entitlement vector to manage multiple different resources.

An entitlement vector can be used to simultaneously manage and activate entitlement of objects and processes to various resources independently from one another. The entitlement vectors enable data and resource parallelism of multiple objects and processes simultaneously accessing a plurality of resources of various types, wherein operations can be performed on different data. Referring to FIGS. 4A through 4R, schematic flow diagrams depict an embodiment or embodiments of a method operable in an information handling apparatus adapted to facilitate resource allocation using an entitlement vector to manage multiple different resources. Referring to FIG. 4A, a method 400 for handling information can comprise providing 401 an entitlement vector and specifying 402 in the entitlement vector resources used by at least one object of a plurality of objects. The method 400 can further comprise scheduling 403 a plurality of threads based at least partly on entitlement as specified by the entitlement vector.

In various embodiments, the resources can comprise physical/logical resources and operational resources. The physical/logical resources can comprise at least one of a group consisting of physical and/or logical instances of processors, central processing units (CPUs), graphics hardware, network controllers, memory, memory management, hardware, microarchitecture, sound cards, video cards, network interfaces, instruction set architecture (ISA), library calls, library functions, software objects, compilers, and operating systems. The operational resources can comprise at least one of power, voltage, current, electrons, frequency, execution cycles, battery consumption, battery life, constraints, temperature, and measurable phenomena.

Figure 4B:
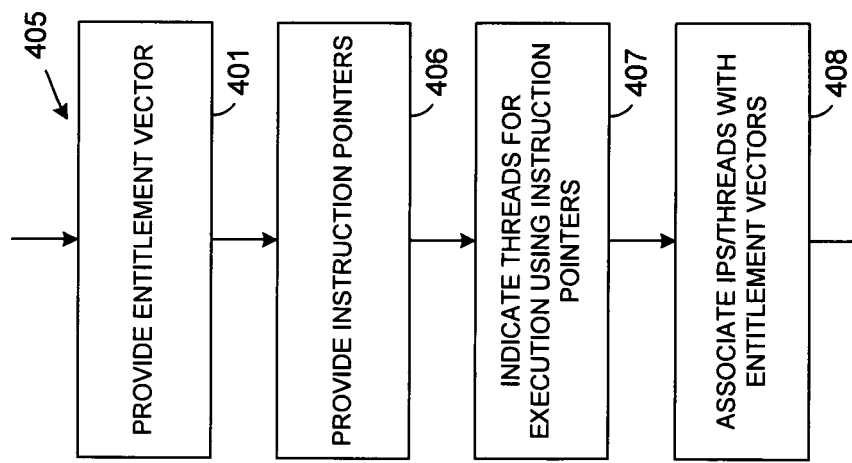
Figure 4A:
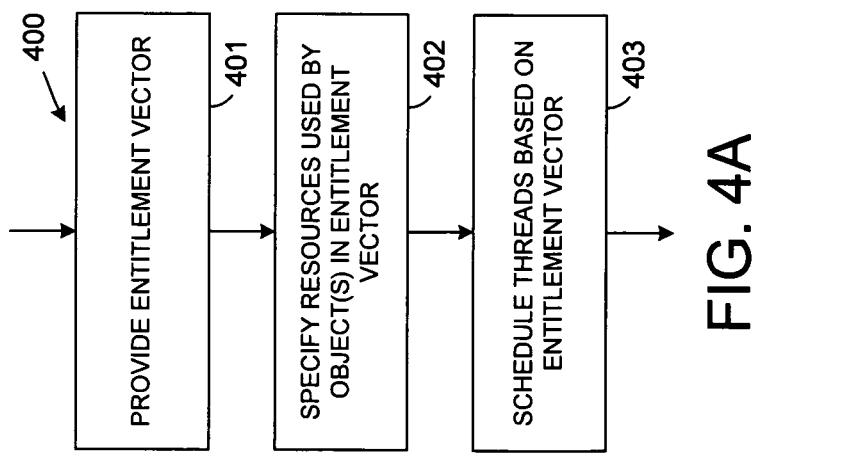
Figure 4F:
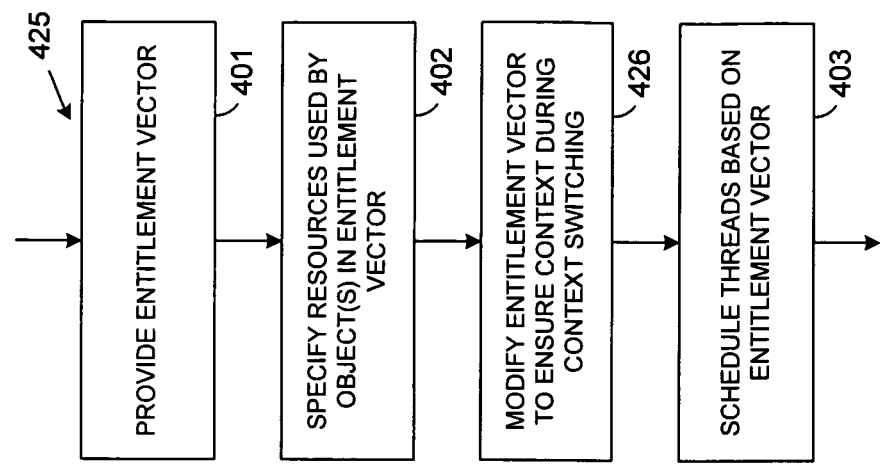
Figure 4E:
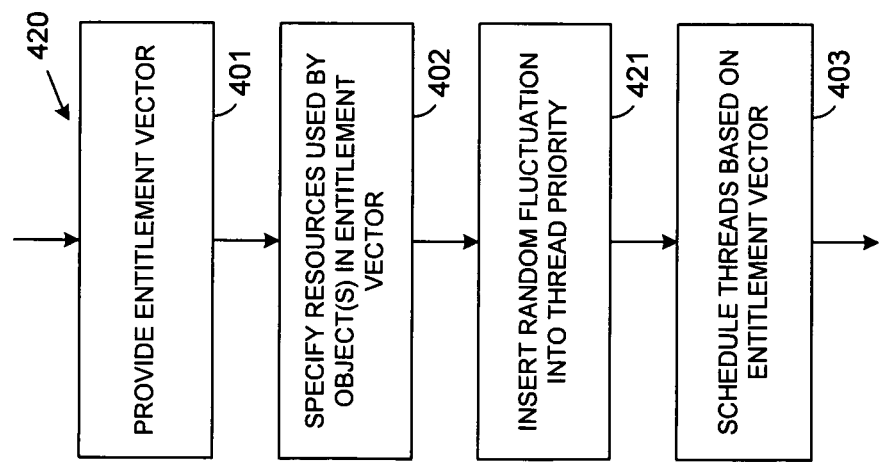

Referring to FIG. 4B, a method 405 for handling information can further comprise providing 406 a plurality of instruction pointers, and indicating 407 respective ones of the plurality of threads for execution using the plurality of instruction pointers. The method 405 can further comprise associating 408 the plurality of instruction pointers and/or threads with ones of a respective plurality of entitlement vectors.

In various embodiments and/or applications, as illustrated in FIG. 4C, a method 410 for handling information can further comprise respectively associating 411 a plurality of entitlement vectors with a plurality of threads, and scheduling 412 the plurality of threads based at least partly on mutual comparison of the plurality of entitlement vectors.

Figure 4D:
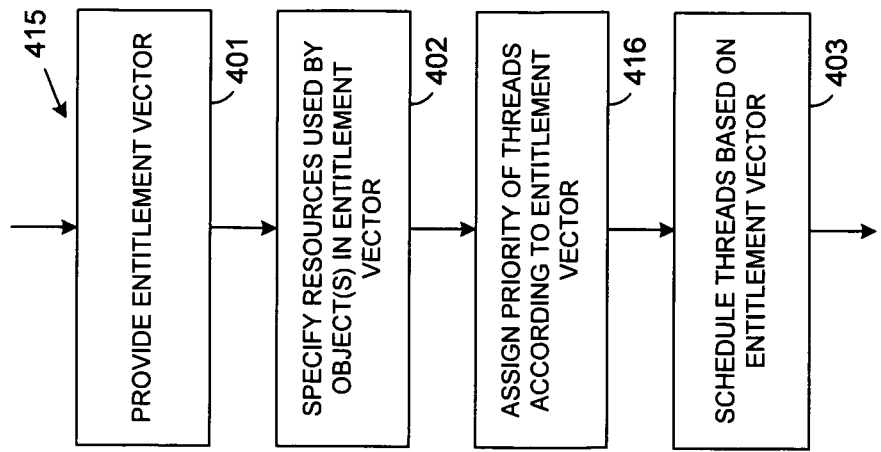
Figure 4L:
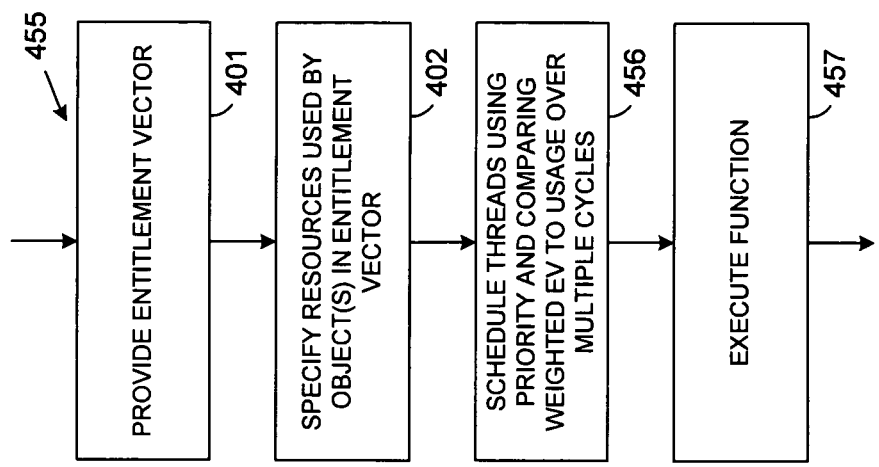
Figure 4K:
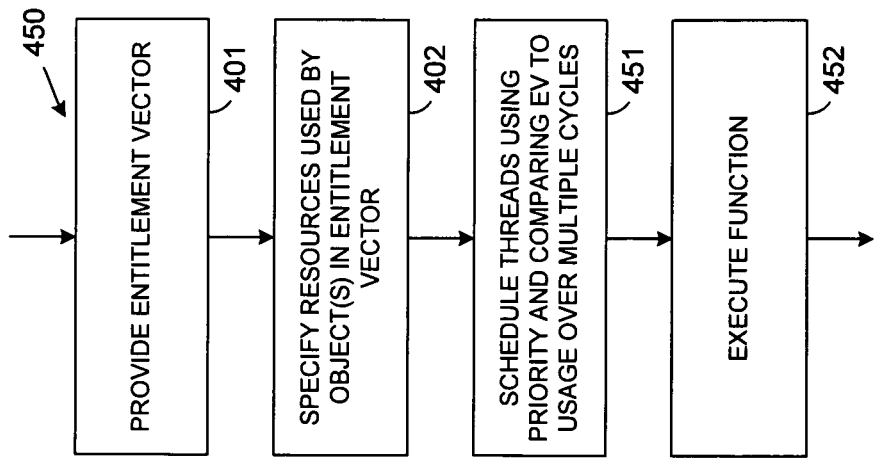

As shown in FIG. 4D, a method 415 for handling information can further comprise assigning 416 priority among the plurality of threads using the entitlement as specified by the entitlement vector.

In other embodiments and/or applications, as depicted in FIG. 4E, a method 420 for handling information can further comprise inserting 421 random fluctuation into the priority among the plurality of threads. Random fluctuation can be inserted 421 into the priority using various randomization techniques such as a Boltzmann search, simulated annealing, hop-around, oscillation for detecting a local maximum, comparing new to previous optimum, a lateral computing technique, and the like.

Similarly, illustrated in FIG. 4F, a method 425 for handling information can further comprise modifying 426 the entitlement vector and ensure correct context of the entitlement vector during context switching.

Furthermore, referring to FIG. 4G, a method 430 for handling information can further comprise modifying 431 the entitlement vector comprising a library call operable to ensure correct context of the entitlement vector during context switching.

Various methods can use the entitlement vectors to schedule threads. For example, as shown in FIG. 4H, method 435 for handling information can further comprise scheduling 436 ones of the plurality of threads wherein ones of a plurality of entitlement vectors respectively associated with ones of the plurality of threads are arguments of at least one function. The method 435 can further comprise executing 437 the at least one function.

Referring to FIG. 4I, a method 440 for handling information can further comprise scheduling 441 ones of the plurality of threads wherein ones of the plurality of entitlement vectors respectively associated with ones of the plurality of threads and resource usage level are arguments of at least one function. The method 440 can further comprise executing 442 the at least one function.

Figure 4J:
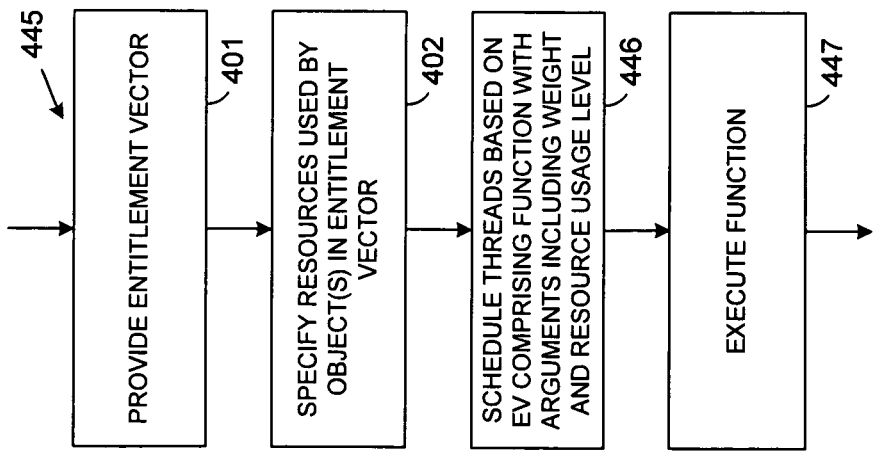
Figure 4O:
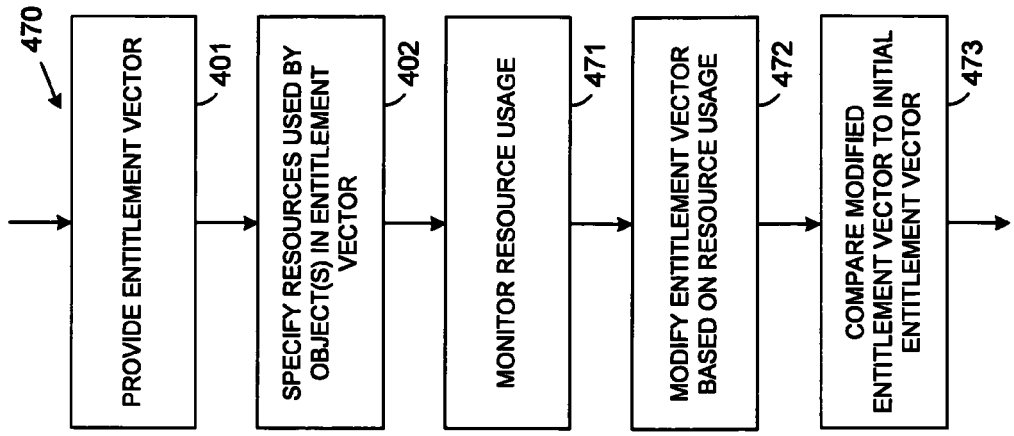

In various embodiments and/or applications, as illustrated in FIG. 4J, a method 445 for handling information can further comprise scheduling 446 ones of the plurality of threads wherein ones of the plurality of entitlement vectors respectively associated with ones of the plurality of threads, weight, and resource usage level are arguments of at least one function. The method 446 can further comprise executing 447 the at least one function.

In additional embodiments, as shown in FIG. 4K, a method 450 for handling information can further comprise scheduling 451 ones of the plurality of threads wherein for a thread, $priority_i$ is determined by a comparison of $weight_i$ times entitlement vector, to resource usage $level_i$ over a plurality of cycles i. The method 451 can further comprise executing 452 the at least one function.

In other embodiments and/or applications, as depicted in FIG. 4L, a method 455 for handling information can further comprise scheduling 456 ones of the plurality of threads wherein for a thread, priority is determined at least partly by a comparison of a sum of $weight_i$ times $entitlement vector_i$ over a plurality of cycles i to resource usage level. The method 455 can further comprise executing 457 the at least one function.

Resource monitoring enables the entitlement vector to be dynamically modified during execution to improve resource allocation according to resource usage. Accordingly, as illustrated in FIG. 4M, a method 460 for handling information can further comprise monitoring 461 resource usage during execution and indicating 462 the resource usage in a usage vector.

Figure 4N:
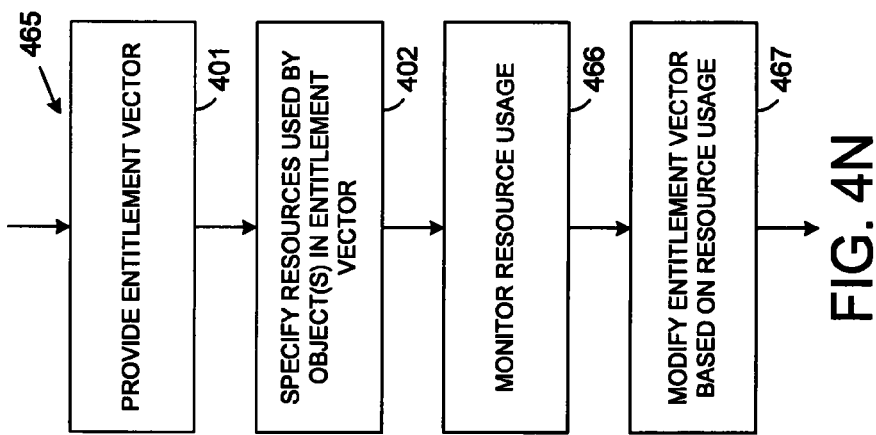
Figure 4M:
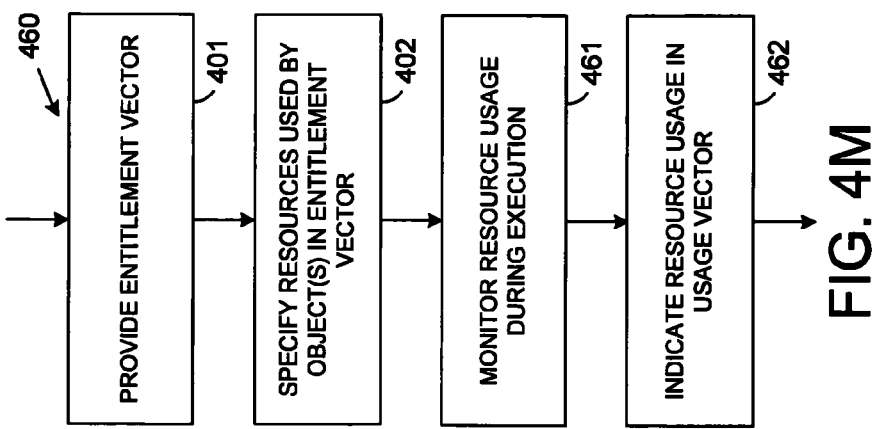
Figure 4R:
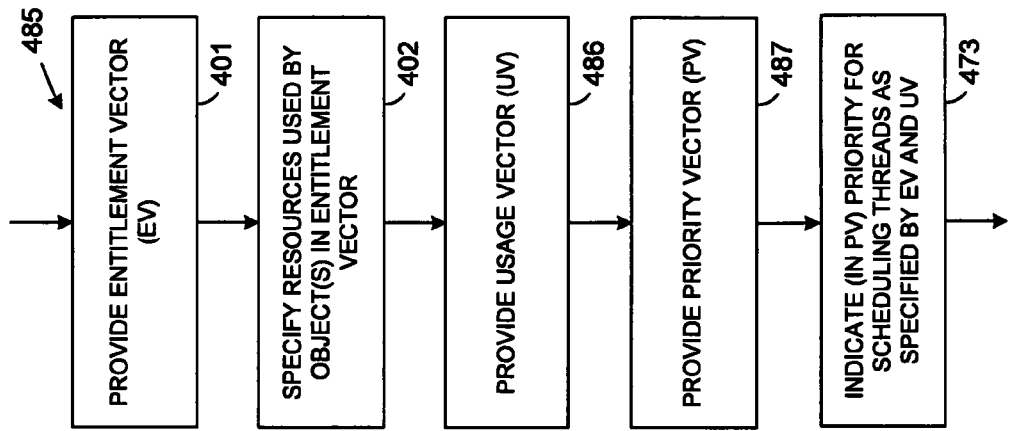

Furthermore, referring to FIG. 4N, a method 465 for handling information can further comprise monitoring 466 resource usage, and modifying 467 the entitlement vector based on the resource usage.

In additional embodiments, as shown in FIG. 4O, method 470 for handling information can further comprise monitoring 471 resource usage, modifying 472 the entitlement vector based on the resource usage, and comparing 473 the modified entitlement vector to a user-set or default initial entitlement vector.

Figure 4Q:
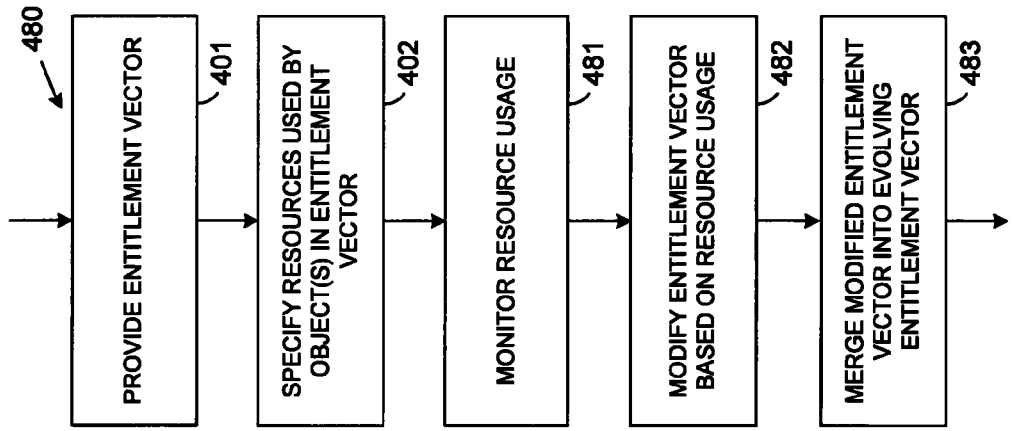
Figure 4P:
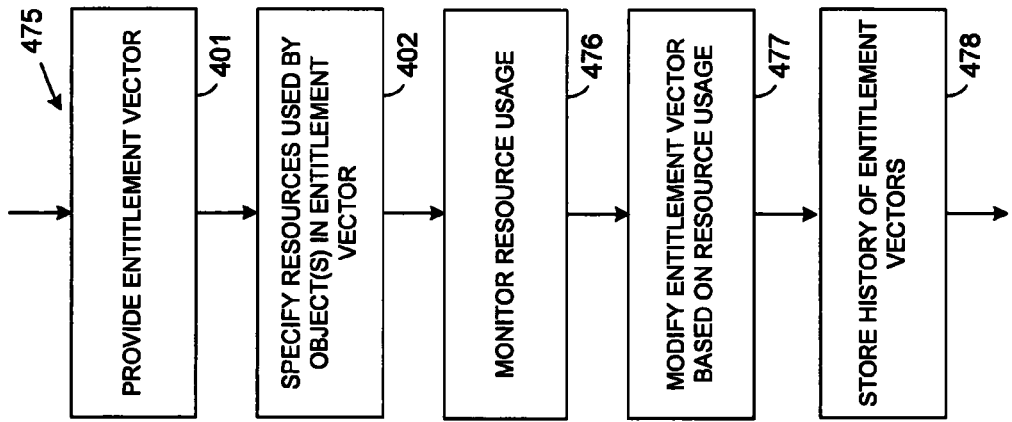

Referring to FIG. 4P, a method 475 for handling information can further comprise monitoring 476 resource usage, modifying 477 the entitlement vector based on the resource usage. The method 475 can further comprise storing 478 a history of entitlement vectors in an entitlement vector memory.

In various embodiments and/or applications, as illustrated in FIG. 4Q, a method 480 for handling information can further comprise monitoring 481 resource usage, modifying 482 the entitlement vector based on the resource usage, and merging 483 the modified entitlement vector into an evolving entitlement vector.

Similarly, as shown in FIG. 4R, a method 485 for handling information can further comprise providing 486 a usage vector, providing 487 a priority vector, and indicating 488, in the priority vector, priority for scheduling a plurality of threads as a function of a combination of entitlement as specified by the entitlement vector and resource usage as specified by a usage vector.

A method enables threads to be scheduled with respect to associated entitlement vectors using various functions, either linear or nonlinear, with arguments such as entitlement, usage, priority, weighting, and the like. Referring to FIGS. 5A through 5F, schematic flow diagrams show an embodiment or embodiments of a method operable in an information handling apparatus that uses predetermined functions with arguments indicative of resource usage to facilitate allocation of resources. Accordingly, in an illustrative embodiment, referring to FIG. 5A, a method 500 for handling information can comprise providing 501 a plurality of entitlement vectors, and specifying 502, in ones of the plurality of entitlement vectors, resources used by at least one object of a plurality of objects. The method 500 can further comprise scheduling 503 a process of a plurality of processes wherein ones of the plurality of entitlement vectors respectively associated with ones of the plurality of processes are arguments of the least one function.

Referring to FIG. 5B, a method 505 for handling information can further comprise executing 506 the at least one function.

As shown in FIG. 5C, a method 510 for handling information can further comprise scheduling 511 ones of the plurality of processes wherein ones of the plurality of entitlement vectors respectively associated with ones of the plurality of processes and resource usage level are arguments of the at least one function.

Figure 5F:
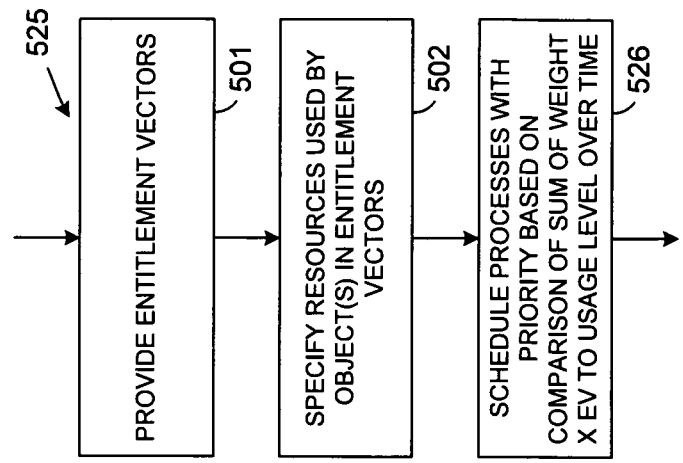
Figure 5E:
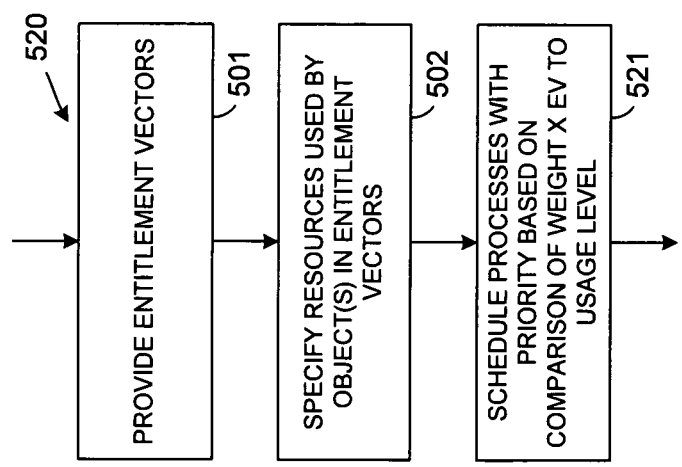
Figure 5D:
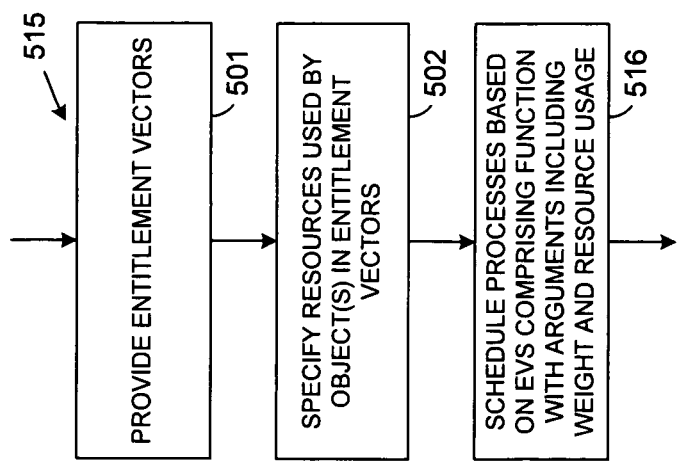

Similarly, as shown in FIG. 5D, a method 515 for handling information can further comprise scheduling 516 ones of the plurality of processes wherein ones of the plurality of entitlement vectors respectively associated with ones of the plurality of processes, weight, and resource usage level are arguments of the at least one function.

In additional embodiments, as shown in FIG. 5E, method 520 for handling information can further comprise scheduling 521 ones of the plurality of processes wherein for a process, $priority_i$ is determined by a comparison of $weight_i$ times $entitlement vector_i$ to resource usage $level_i$ over a plurality of cycles i.

In further embodiments, depicted in FIG. 5F, a method 525 for handling information can further comprise scheduling 526 ones of the plurality of processes wherein for a process, priority is determined at least partly by a comparison of a sum of weight, times entitlement vector, over a plurality of cycles i to resource usage level.

Operating methods can use dynamic monitoring of an entitlement vector during execution to improve resource allocation according to resource usage.

Referring to FIGS. 6A through 6F, schematic flow diagrams illustrate an embodiment or embodiments of a method operable in an information handling apparatus that employs a usage vector which can determined by logic which monitors resource usage during execution. Accordingly, in an illustrative embodiment, referring to FIG. 6A, a method 600 for handling information can comprise providing 601 an entitlement vector, and specifying 602, in the entitlement vector, resources used by at least one object of a plurality of objects. The method 600 can further comprise monitoring 603 resource usage during execution of a plurality of processes, and indicating 604 the resource usage in a usage vector.

Figure 6C:
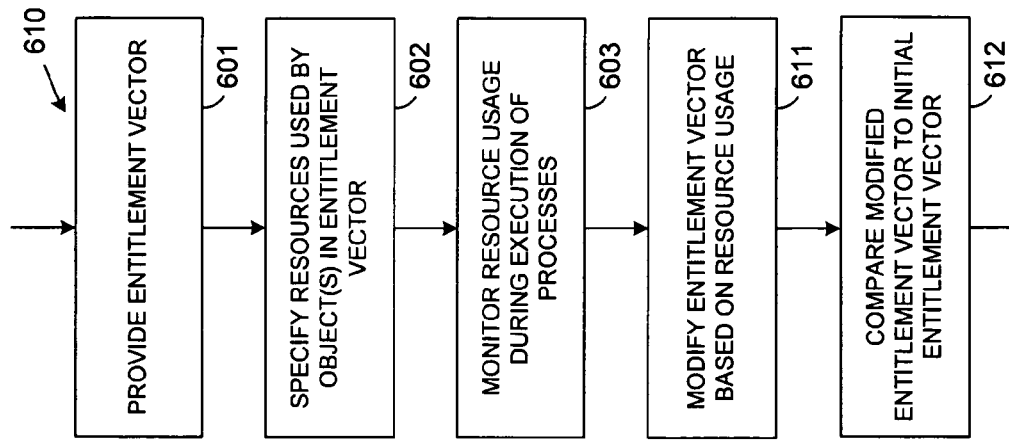
Figure 6B:
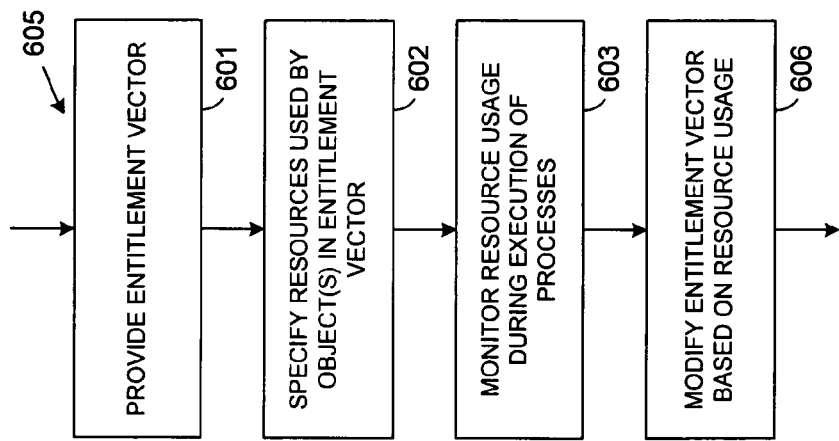
Figure 6A:
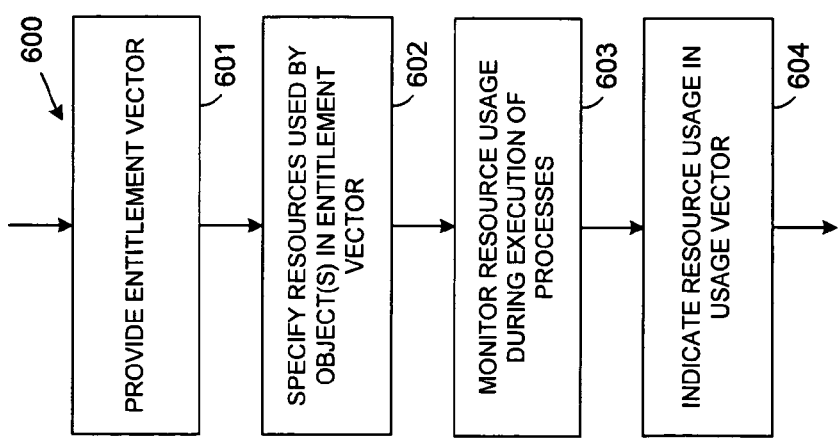

Referring to FIG. 6B, a method 605 for handling information can further comprise modifying 606 the entitlement vector based on the resource usage.

As shown in FIG. 6C, a method 610 for handling information can further comprise modifying 611 the entitlement vector based on the resource usage, and comparing 612 the modified entitlement vector to a user-set or default initial entitlement vector.

Similarly, as shown in FIG. 6D, a method 615 for handling information can further comprise modifying 616 the entitlement vector based on the resource usage, and storing 617 a history of entitlement vectors in an entitlement vector memory.

In additional embodiments, as shown in FIG. 6E, method 620 for handling information can further comprise modifying 621 the entitlement vector based on the resource usage, and merging 622 the modified entitlement vector into an evolving entitlement vector.

In further embodiments, depicted in FIG. 6F, a method 625 for handling information can further comprise indicating 626, in a priority vector, priority for scheduling a plurality of processes as a function of a combination of entitlement as specified by the entitlement vector and resource usage as specified by a usage vector.

Figure 7:
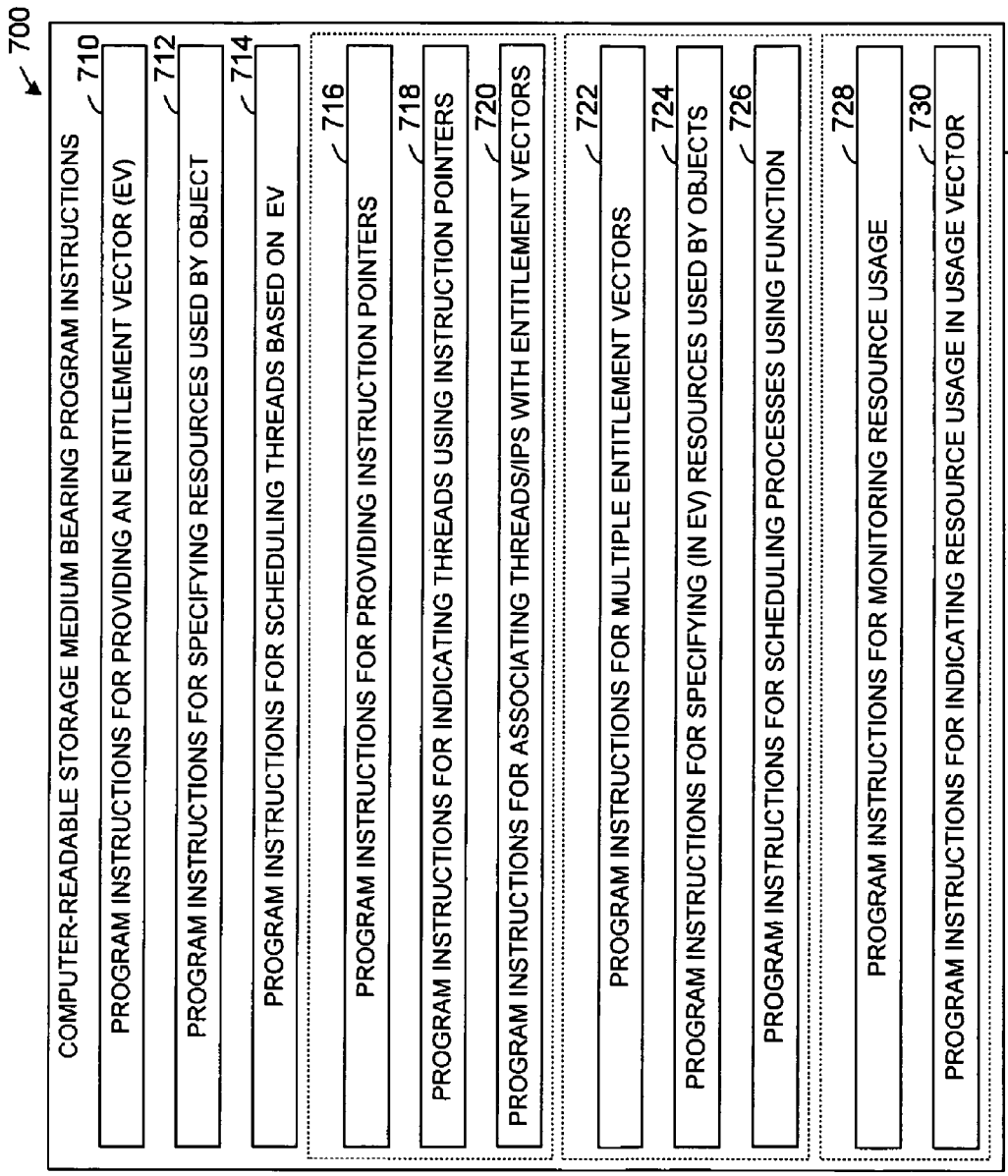
FIG. 7 is a schematic block diagram showing an embodiment of a computer program product including a computer-readable storage medium bearing program instructions that is operable to facilitate resource allocation using an entitlement vector to manage multiple different resources.

Referring to FIG. 7, an embodiment comprises a computer program product 700. The computer program product includes a computer-readable storage medium 706 bearing program instructions. The program instructions are operable to perform a process in a computing device. The computer program product can be constituted as any combination of one or more computer usable or computer readable medium(s), for example but not limited to, communication, electronic, semiconductor, magnetic, optical, electromagnetic, infrared, in the form of propagation medium, system, apparatus, device, or the like. Specific examples of the computer-readable medium may include, are not limited to, a wired connection, a wireless connection, Internet or an intranet transmission media, an optical fiber, a magnetic storage device, a portable diskette, a hard disk, a portable compact disc read-only memory (CDROM), an optical storage device, a random access memory (RAM), a read-only memory (ROM), an erasable programmable read-only memory (EPROM), Flash memory, or the like. Similarly, the computer-usable or computer-readable medium can be a visual display such as paper, poster, screen view, that can be visually or electronically captured such as by optical scanning of a medium, then compiled, interpreted, or otherwise processed.

The program instructions can comprise program instructions 710 operable to program instructions operable to program instructions operable to provide an entitlement vector, and program instructions 712 operable to specify, in the entitlement vector, resources used by at least one object of a plurality of objects. The computer program product 700 can further comprise program instructions 714 operable to schedule a plurality of threads based at least partly on entitlement as specified by the entitlement vector.

In some embodiments, the computer program product can further comprise program instructions 716 operable to provide a plurality of instruction pointers, and program instructions 718 operable to indicate respective ones of the plurality of threads for execution using the plurality of instruction pointers. The computer program product 700 can further comprise program instructions 720 operable to associate the plurality of instruction pointers and/or threads with ones of a respective plurality of entitlement vectors.

In further embodiments and/or applications, the computer program product can further comprise program instructions 722 operable to provide a plurality of entitlement vectors, and program instructions 724 operable to specify, in the entitlement vectors, resources used by at least one object of a plurality of objects, and program instructions 726 operable to schedule a process of a plurality of processes wherein ones of the plurality of entitlement vectors respectively associated with ones of the plurality of processes are arguments of the least one function.

The program instructions can comprise program instructions 728 operable to monitor resource usage during execution of a plurality of processes, and program instructions 730 operable to indicate the resource usage in a usage vector.

Figure 8:
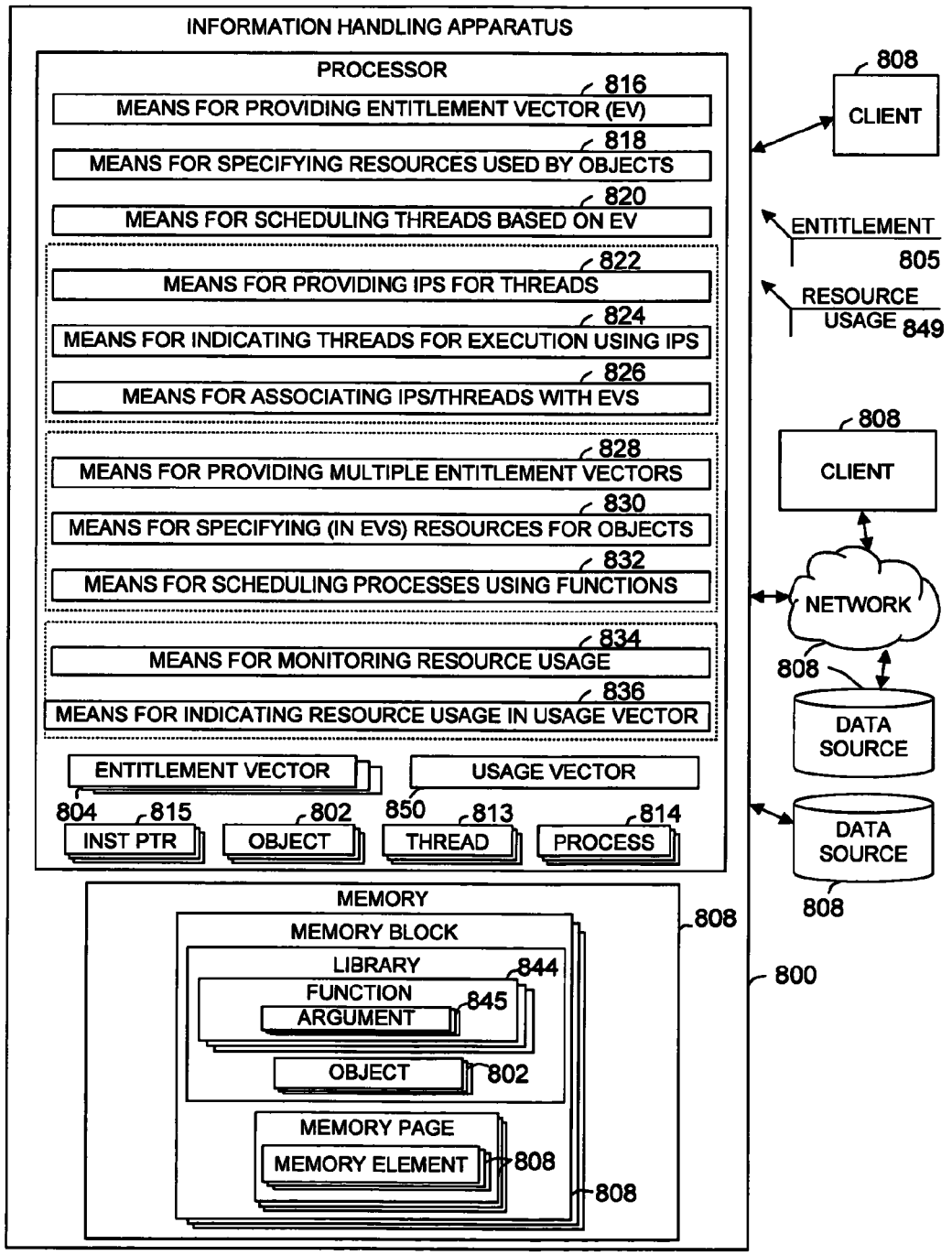
FIG. 8 is a schematic block diagram illustrating an embodiment of an information handling apparatus which is adapted to facilitate resource allocation to a selected priority using an entitlement vector and scheduling subsequent usage of resources to deferred objects and processes.

Referring to FIG. 8, a schematic block diagram illustrates an embodiment of an information handling apparatus 800 which is adapted to facilitate resource allocation to a selected priority using an entitlement vector and scheduling subsequent usage of resources to deferred objects and processes. In selected embodiments, the information handling apparatus 800 can comprise means 816 for providing an entitlement vector 804, and means 818 for specifying, in the entitlement vector 804, resources 808 used by at least one object 802 of a plurality of objects 802. The information handling apparatus 800 can further comprise means 820 for scheduling a plurality of threads 813 based at least partly on entitlement 805 as specified by the entitlement vector 804.

In various embodiments, the information handling apparatus 800 can further comprise means 822 for providing a plurality of instruction pointers 815, and means 824 for indicating respective ones of the plurality of threads 813 for execution using the plurality of instruction pointers 815. The information handling apparatus 800 can further comprise means 826 for associating the plurality of instruction pointers 815 and/or threads 813 with ones of a respective plurality of entitlement vectors 804.

In further embodiments and/or applications, the information handling apparatus 800 can further comprise means 828 for providing a plurality of entitlement vectors 804, and means 830 for specifying, in the entitlement vectors 804, resources 808 used by at least one object 802 of a plurality of objects 802. The information handling apparatus 800 can further comprise means 832 for scheduling a process 814 of a plurality of processes 814 wherein ones of the plurality of entitlement vectors 804 respectively associated with ones of the plurality of processes 814 are arguments 845 of at least one function 844.

In some embodiments, the entitlement vector can be dynamically modified during execution to improve resource allocation according to resource usage. Accordingly, the information handling apparatus 800 can further comprising means 834 for monitoring resource usage 849 during execution of a plurality of processes 814, and means 836 for indicating the resource usage 849 in a usage vector 850.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:

1. An information handling apparatus comprising:
   at least one processor including at least:
   one or more entitlement vectors configured to allocate one or more user-specified rights to one or more resources used by one or more threads, wherein the one or more entitlement vectors are respectively associated with the one or more threads;
   one or more instruction pointers configured to indicate a respective one or more threads of the one or more threads for execution;
   a scheduler configured to schedule the respective one or more threads for execution based at least partly on comparison of a resource entitlement as allocated by the one or more entitlement vectors, and configured to assign priority among the respective one or more threads; and
   logic used by the scheduler to schedule one of the one or more threads, wherein the one or more of the entitlement vectors respectively associated with the respective one or more of the threads, one or more weights, and one or more resource usage levels are arguments used by the logic, and for a selected thread priority$_i$ is determined at least partly by a comparison of weight$_i$×entitlement vector$_i$ entitlement to resource usage level$_i$ over a plurality of cycles i.

2. The information handling apparatus according to claim 1 further comprising:
   randomization logic configured to insert random fluctuation into the priority among the one or more threads.

3. The information handling apparatus according to claim 2 wherein:
   the randomization logic is configured to insert random fluctuation into the priority using randomization selected from a group including a Boltzmann search, simulated annealing, hop-around, oscillation for detecting a local maximum, comparing new to previous optimum, and a lateral computing technique.

4. The information handling apparatus according to claim 1 further comprising:
   supervisory logic configured to modify the one or more of the entitlement vectors and ensure correct context of the one or more of the entitlement vectors during context switching.

5. The information handling apparatus according to claim 1 further comprising:
   supervisory logic configured to modify the one or more of the entitlement vectors comprising a library call configured to ensure correct context of the one or more of the entitlement vectors during context switching.

6. The information handling apparatus according to claim 1 further comprising:
   the logic is used by the scheduler to schedule ones of the plurality of threads wherein for a thread, priority is determined at least partly by a comparison of a sum of weight$_i$×entitlement vector$_i$ entitlement over a plurality of cycles i to resource usage level.

7. The information handling apparatus according to claim 1 further comprising:
   monitoring logic configured to monitor the resource usage of the one or more threads during execution and indicate the resource usage in a respective usage vector of the one or more threads.

8. The information handling apparatus according to claim 1 further comprising:
   monitoring logic configured to monitor the resource usage and modify the respective one or more of the entitlement vectors of the respective one or more threads based on the respective resource usage.

9. The information handling apparatus according to claim 1 further comprising:
   monitoring logic configured to monitor resource usage, modify at least one of the one or more entitlement vectors based on the resource usage, and compare the modified at least one of the one or more entitlement vectors to a user-set or default initial entitlement vector.

10. The information handling apparatus according to claim 1 further comprising:
    monitoring logic configured to monitor resource usage, modify the entitlement vector based on the resource usage; and
    an entitlement vector memory configured to store a history of entitlement vectors.

11. The information handling apparatus according to claim 1 further comprising:
    monitoring logic configured to monitor resource usage, modify at least one of the one or more entitlement vectors based on the resource usage, and merge the modified at least one of the one or more entitlement vectors into an evolving entitlement vector.

12. The information handling apparatus according to claim 1 further comprising:
    a priority vector configured to indicate priority for scheduling the respective one or more threads as a function of a combination of entitlement as specified by at least one of the one or more entitlement vectors and a resource usage as specified by a usage vector.

13. The information handling apparatus according to claim 1 wherein:
    the resources comprise a plurality of resources comprising physical/logical resources and operational resources.

14. The information handling apparatus according to claim 13 wherein the physical/logical resources are at least one of a group including physical and/or logical instances of:
  processors, central processing units (CPUs), graphics hardware, network controllers, memory, memory management, hardware, microarchitecture, sound cards, video cards, network interfaces, instruction set architecture (ISA), library calls, library functions, software objects, compilers, and operating systems.

15. The information handling apparatus according to claim 13 wherein the operational resources are at least one of a group including:
  power, voltage, current, electrons, frequency, execution cycles, battery consumption, battery life, constraints, temperature, and measurable phenomena.

16. An information handling apparatus comprising:
  at least one processor including at least:
  one or more entitlement vectors configured to allocate one or more user-specified rights to one or more resources used by one or more processes, wherein the one or more entitlement vectors are respectively associated with the one or more processes;
  one or more instruction pointers configured to indicate the one or more processes for execution; and
  logic configured to schedule the one or more processes for execution based at least partly on comparison of a resource entitlement as allocated by the one or more entitlement vectors, and configured to assign priority among the respective one or more processes, wherein the one or more entitlement vectors respectively associated with the one or more processes, one or more weights, and one or more resource usage levels are arguments used by the logic, and for a selected process priority$_i$ is determined by a comparison of weight$_i$×entitlement vector$_i$ entitlement to resource usage level$_i$ over a plurality of cycles i.

17. The information handling apparatus according to claim 16 wherein:
  the logic is configured to schedule the one or more processes wherein priority$_i$ is determined by a comparison of a sum of a product of weight$_i$×entitlement vector$_i$ entitlement to resource usage level$_i$ over a plurality of cycles i.

18. The information handling apparatus according to claim 16 wherein:
  the logic is configured to schedule the one or more processes wherein priority is determined at least partly by a comparison of a sum of weight$_i$×entitlement vector$_i$ entitlement over a plurality of cycles i to resource usage level.

19. An information handling apparatus comprising:
  at least one processor including at least:
  one or more entitlement vectors configured to allocate one or more user-specified rights to one or more resources used by one or more processes, wherein the one or more entitlement vectors are respectively associated with the one or more processes;
  one or more instruction pointers configured to indicate the one or more processes for execution; and
  monitoring logic configured to monitor resource usage during execution of the one or more processes and indicate the resource usage in one or more usage vectors, the one or more usage vectors used in combination with the one or more entitlement vectors for scheduling the one or more processes for execution in the at least one processor based at least partly on comparison of a resource entitlement as allocated by the one or more entitlement vectors, and configured to assign priority among the respective one or more processes, wherein the respective one or more entitlement vectors respectively associated with the respective one or more processes, the one or more usage vectors, and one or more weights are arguments used for scheduling the one or more processes, and for a selected process priority$_i$ is determined by a comparison of weight$_i$×entitlement vector$_i$ entitlement to resource usage level$_i$ over a plurality of cycles i.

20. The information handling apparatus according to claim 19 wherein:
  the monitoring logic is configured to monitor resource usage and modify the one or more entitlement vectors based on the resource usage.

21. The information handling apparatus according to claim 19 wherein:
  the monitoring logic is configured to monitor resource usage, modify the one or more entitlement vectors based on the resource usage, and compare the modified one or more entitlement vectors to a user-set or default initial entitlement vector.

22. The information handling apparatus according to claim 19 further comprising:
  an entitlement vector memory; wherein:
  the monitoring logic is configured to monitor resource usage, modify the one or more entitlement vectors based on the resource usage; and
  the entitlement vector memory is operable to store a history of entitlement vectors.

23. The information handling apparatus according to claim 19 wherein:
  the monitoring logic is configured to monitor resource usage, modify the one or more entitlement vectors based on the resource usage, and merge the modified one or more entitlement vectors into an evolving entitlement vector.

24. The information handling apparatus according to claim 19 further comprising:
  one or more priority vectors configured to indicate priority for scheduling the one or more processes as a function of a combination of entitlement as specified by the one or more entitlement vectors and resource usage as specified by the one or more usage vectors.

* * * * *